United States Patent
Sinyavskiy et al.

(10) Patent No.: US 11,454,983 B2
(45) Date of Patent: Sep. 27, 2022

(54) SYSTEMS, APPARATUSES, AND METHODS FOR BIAS DETERMINATION AND VALUE CALCULATION OF PARAMETERS OF A ROBOT

(71) Applicant: Brain Corporation, San Diego, CA (US)

(72) Inventors: Oleg Sinyavskiy, San Diego, CA (US); Girish Bathala, San Diego, CA (US)

(73) Assignee: Brain Corporation, San Diego, CA (US)

( * ) Notice: Subject to any disclaimer, the term of this patent is extended or adjusted under 35 U.S.C. 154(b) by 38 days.

(21) Appl. No.: 17/176,501

(22) Filed: Feb. 16, 2021

(65) Prior Publication Data

US 2021/0191401 A1 Jun. 24, 2021

Related U.S. Application Data

(63) Continuation of application No. PCT/US2019/046788, filed on Aug. 16, 2019.

(60) Provisional application No. 62/719,359, filed on Aug. 17, 2018.

(51) Int. Cl.
| | | |
|---|---|---|
| *G05D 1/02* | (2020.01) | |
| *G01C 21/00* | (2006.01) | |
| *G01C 21/16* | (2006.01) | |
| *G01C 25/00* | (2006.01) | |

(52) U.S. Cl.
CPC .......... *G05D 1/027* (2013.01); *G01C 21/165* (2013.01); *G01C 21/3848* (2020.08); *G01C 25/00* (2013.01)

(58) Field of Classification Search
CPC .. G05D 1/027; G01C 21/165; G01C 21/3848; G01C 25/00
See application file for complete search history.

(56) References Cited

U.S. PATENT DOCUMENTS

| | | |
|---|---|---|
| 2018/0120116 A1 | 5/2018 | Rombouts et al. |
| 2018/0147721 A1* | 5/2018 | Griffin ................. G05D 1/0274 |

OTHER PUBLICATIONS

International Search Report and Written Opinion for PCT/US19/46788 dated Nov. 13, 2019.

* cited by examiner

*Primary Examiner* — Yuen Wong
(74) *Attorney, Agent, or Firm* — Reed Smith LLP; Sidharth Kapoor

(57) ABSTRACT

Systems, apparatuses, and methods for bias determination and value calculation of parameters of a robot are disclosed herein. According to at least one exemplary embodiment, a bias in a navigation parameter may be determined based on a bias in one or more measurement units, wherein a navigation parameter may be a parameter useful to a robot to recreate a route such as, for example, velocity and the bias may be accounted for to more accurately recreate the route and generate accurate maps of an environment.

18 Claims, 16 Drawing Sheets

SYSTEMS, APPARATUSES, AND METHODS FOR BIAS DETERMINATION AND VALUE CALCULATION OF PARAMETERS OF A ROBOT

PRIORITY

This application is a continuation of International Patent Application No. PCT/US19/46788 filed Aug. 16, 2019 and claims the benefit of U.S. Provisional Patent Application Ser. No. 62/719,359 filed on Aug. 17, 2018 under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems, apparatuses, and methods for bias determination and value calculation of parameters of a robot.

Background

Currently, many robots may perform a plurality of functions, such as, for example, learning a route through an environment by having a human operator navigate the robot along the route. The robots may, for example, follow the operator, be pushed by the operator, or be driven by the operator to learn the route. As the operator navigates the robot along the route, the robot may store odometry and sensor data recorded during navigation of the route to be recalled at a later time to recreate the route.

However, data collected by the sensors and odometry of the robot may be susceptible to biases of the sensor and odometry instruments. These biases may cause the robot to recreate the route incorrectly due to, for example, oversteering due to an overbiased steering encoder. These biases may be intrinsic to the sensor or odometry unit used or may be caused due to wear and tear on the robot causing the sensors or odometry unit to become poorly calibrated.

Additionally, the sensor and odometry units may further comprise noise, which may further affect the ability of the robot to recreate the route. Accordingly, there is a need in the art for systems and methods for determining biases and values of parameters of a robot such that a robot, for example, may accurately recreate a learned route based on sensor and odometry data.

SUMMARY

The foregoing needs are satisfied by the present disclosure, which provides for, inter alia, systems, apparatuses, and methods for bias determination and value calculation of parameters of a robot. The systems and methods disclosed herein are directed towards a practical application of bias determination and value calculation of parameters of a robot to enhance navigation, safety, mapping and localization capabilities, and task performance of the robot by enabling the robot to account for biases in its constituent components.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a robotic system is disclosed. The robotic system may comprise a plurality of sensors and odometry units, such as, for example, light detection and ranging (LiDAR) sensors, gyroscopes, accelerometers, and encoders. Each of these units may not be perfectly calibrated in most situations and may therefore comprise some bias in measurements outputted by the sensor and/or odometry units. The biases of the odometry and sensor units may cause navigation parameters of the robotic system to be biased, wherein the navigation parameters comprise parameters useful for recreating and/or navigating a route, such as, for example, angular velocity, translational velocity, acceleration, and/or localization parameters (e.g., distance measurements to nearby objects).

According to at least one non-limiting exemplary embodiment, a non-transitory computer readable storage medium comprising a plurality of instructions embodied thereon is disclosed. The plurality of instructions may be executed by a specialized processor to cause the specialized processor to navigate a robot along a route and collect data from sensors coupled to the robot; generate a probability distribution function (PDF) of at least one parameter of the robot based on the data from sensors, the at least one parameter describing a physical feature, movement, or internal characteristic of the robot; determine at least one value for the respective at least one parameter based on the respective at least one PDF; and produce a map of an environment based on the at least one value, the map comprising the route and objects localized therein. In some embodiments, the route is navigated while the robot is in a training mode and acting under user guidance (e.g., being pushed, pulled, driven, lead, etc. through the route). The at least one PDF may be calculated, at least in part, as a kinematic model of the robot.

According to at least one non-limiting exemplary embodiment, the computer readable instructions further configure the processor to utilize the map to navigate the robot along the route.

According to at least one non-limiting exemplary embodiment, the computer readable instructions further configure the processor to utilize the at least one value and a predetermined kinematic model of the robot to determine a second value of a second parameter of the robot, the second value of the second parameter being utilized to determine actuator commands to configure motions of the robot in accordance with the kinematic model and the route. The second parameter may include, but is not limited to, wheel separation of a wheeled robot, size or radius of wheels, or any other parameter of a kinematic model which describes a physical feature of the robot.

According to at least one non-limiting exemplary embodiment, the at least one PDF comprises, in part, distributions of biases of one or more navigation parameters.

According to at least one non-limiting exemplary embodiment, one of the at least one PDF comprises a distribution of time delays between measurements received by the processor from a first sensor unit and a second sensor unit; the respective value determined based on the PDF represents a most probable or average value of the time delay; and the map is produced based on measurements of the first and second sensor units by accounting for the value of the time delay between measurements from the respective first and second sensors. According to at least one non-limiting exemplary embodiment, a method is disclosed. The method, effectuated by a processor executing computer readable instructions from a memory, comprises navigating a robot along a route while collecting data from sensors coupled to the robot; calculating at least two values of the parameter based on measurements from at least two respective sensor units, the at least two values being calculated based on a predetermined equation or model; collecting measurements of the at least two values as or after the robot navigates the route to generate a probability density function (PDF) of the parameter; estimating a first value of the parameter based on the PDF; and causing the robot to navigate the route based on the first value.

According to at least one non-limiting exemplary embodiment, the estimated first value may comprise a deviation from an ideal value of the parameter, and the parameter may comprise a navigation parameter of the robot. According to at least one non-limiting exemplary embodiment, the first value may comprise a measure of wheel separation of the robot based on, in part, a kinematic model of the robot.

According to at least one non-limiting exemplary embodiment, the method may further comprise producing a computer-readable map based on, at least in part, the first value, the computer-readable map comprising the route and localized objects.

According to at least one non-limiting exemplary embodiment, the at least two values comprise a first value and a second value, the first value being calculated using standalone laser odometry and the second value comprising gyroscope measurements; and the estimated first value comprises a time delay between measurements between the standalone laser odometry and gyroscope which indicate the robot is turning during portions of the route. According to at least one non-limiting exemplary embodiment, the method may further comprise of measuring biases of the gyroscope at locations where the robot is idle upon a flat surface and accounting for the measured biases of the gyroscope during estimation of the first value of the time delay.

According to at least one non-limiting exemplary embodiment, a non-transitory computer readable storage medium is disclosed. The non-transitory computer readable storage medium comprising a plurality of computer readable instructions stored thereon that, when executed by a processor, configure the processor to: navigate a robot through a route and collect data from sensor units coupled to the robot; generate at least one probability distribution function (PDF) of at least one respective parameter of the robot based on the data from the sensor units, the at least one respective parameter comprising a measurement of a physical feature, motion/navigation, or internal characteristic of the robot; determine at least one value for the respective at least one parameter based on the respective at least one PDF; and navigate the robot along the route based on the at least one value of each of the respective at least one parameter. Each of the at least one PDF may be generated using measurements from two or more sensor units. The at least one PDF comprises, at least in part, a PDF of a navigation parameter.

According to at least one non-limiting exemplary embodiment, the computer readable instructions may further configure the processor to generate a computer-readable map based on the at least one respective parameter, the computer-readable map comprising localized objects and the route.

According to at least one non-limiting exemplary embodiment, the computer readable instructions may further configure the processor to determine if one or more sensors and odometry units of the robot require calibration from a human based on a variance of the PDF of the respective parameter meeting or exceeding a prescribed variance threshold.

According to at least one non-limiting exemplary embodiment, the computer readable instructions may further configure the processor to determine a measurement bias of a gyroscope by measuring a second value from the gyroscope at designated locations along the route where the robot is idle upon a flat surface, the second value being equal to the measurement bias.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 10 (iii) is a reference map or ground truth for visual reference to FIG. 10(i-ii), according to an exemplary embodiment.

Figure 1A:
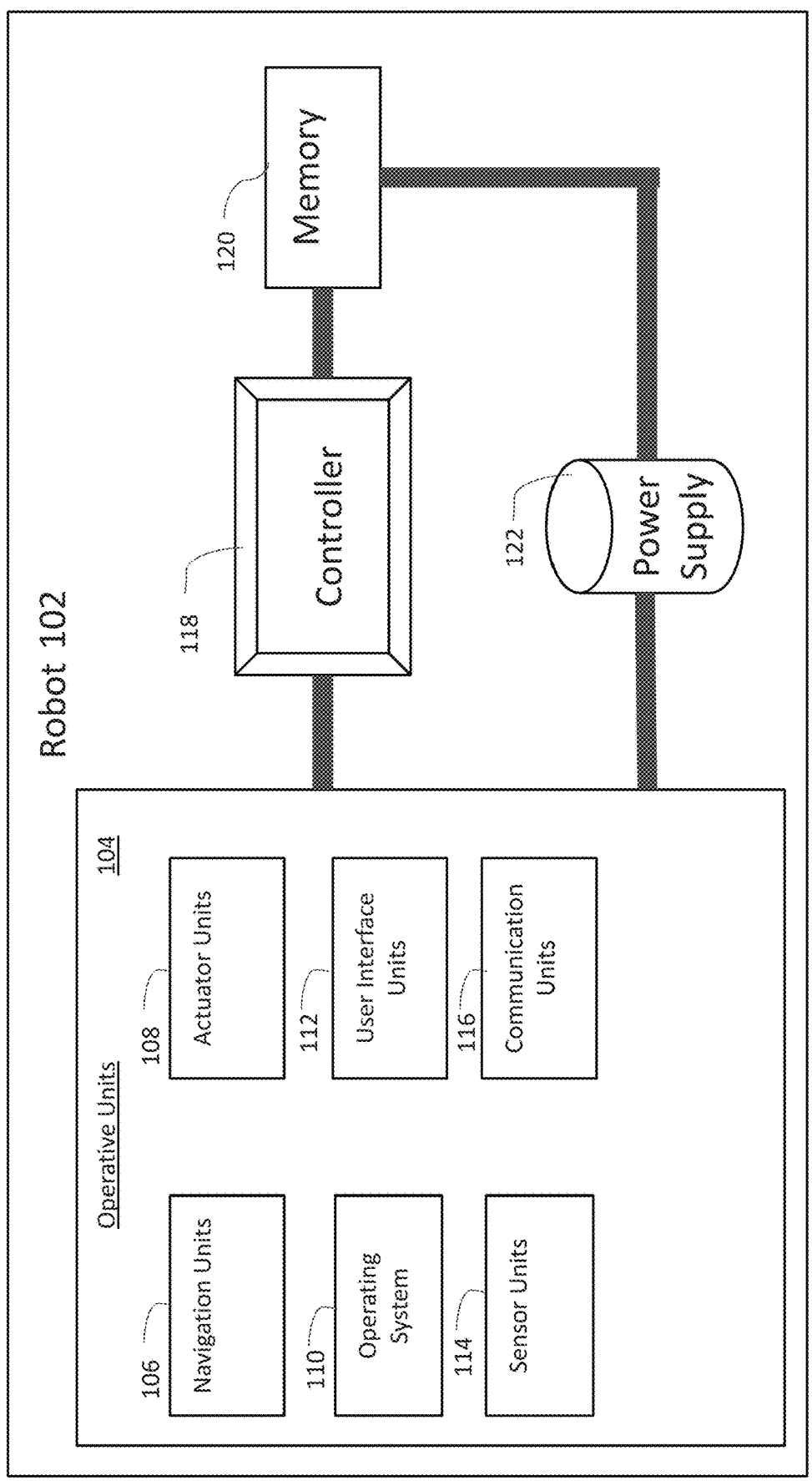
FIG. 1A is a functional block diagram of a main robot in accordance with some exemplary embodiments of this disclosure.

All Figures disclosed herein are © Copyright 2019 Brain Corporation. All rights reserved.

DETAILED DESCRIPTION

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one of ordinary skill in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems, apparatuses, and methods for bias determination and value calculation of parameters of a robot.

As used herein, a robot may include mechanical and/or virtual entities configured to carry out a series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, noise may comprise random modifications to a measurement that may be suffered during capture, storage, transmission, processing, or conversion of the measurement. Noise may follow a random probabilistic distribution; however, the precise value of a noise parameter of a measurement may not be known without observation or direct measurement.

As used herein, a bias may comprise an error which may cause a resulting measurement or parameter to favor a particular measurement or value. Biases may be observed in measurement units (e.g., sensors of a robot), for example, if the measurement units are not perfectly calibrated (e.g., do not give perfect measurements with respect to a ground truth). Similarly, a measurement process may be biased if it systematically overstates or understates the true value of the measurement. For example, a biased thermometer may output a measured temperature ten degrees (10°) above the real temperature, wherein the thermometer may be determined to be over biased by ten degrees (10°). As another example, a mispositioned or misaligned sensor may comprise a bias in all measurements from the sensor if the measurements are taken with respect to an ideal or default position for the sensor and not the actual or real pose of the sensor.

As used herein, measurement parameters may comprise, including, but not limited to, parameters of measurement and/or sensor units. These parameters may include, for example, data from sensors (e.g., depth measurements, images, distance measurements, etc.), data from odometry units (e.g., gyroscopic data, speedometer readings, etc.), and/or internal measurement devices (e.g., encoder data). A measurement parameter may further comprise a measurement bias, due to poor calibration, temperature fluctuations, manufacturing defects, mispositioning of the measurement units, and/or any other reason for a measurement unit (e.g., sensor or odometry unit) to not function ideally (e.g., generate perfect measurements with respect to a ground truth). For example, a gyroscope mounted incorrectly at a tilted angle within a robot may comprise a measurement bias due to the tilt of which the gyroscope is mounted, thereby causing measurement parameters of the gyroscope to comprise a measurement bias proportional to the tilt. Measurement parameter biases may be further illustrated below with respect to FIG. 2A.

As used herein, navigation parameters may comprise parameters useful for a robot to navigate and/or recreate a route. The navigation parameters may include, but are not limited to, angular velocity, translational velocity (e.g., with respect to an x or y coordinate of a Cartesian coordinate system), acceleration, power consumption of the robot, localization parameters (e.g., position of robot and objects with respect to nearby objects and/or an origin), and/or any other state space parameter(s). A navigation parameter may further comprise a bias, wherein the navigation parameter bias may be a difference between a measured navigation parameter (e.g., by a sensor) and an observed navigation parameter (e.g., from an external observer). For example, measured angular velocity (e.g., a navigation parameter) of a robot may comprise a navigation parameter bias causing the robot to turn too quickly or too slowly based on the bias (e.g., over or under biased, respectively). Navigation parameter biases may be further illustrated below with respect to FIG. 2C. It is appreciated that biases in navigation parameters may be caused by one or more biases and/or noise of sensor units and/or actuator units (e.g., a biased or noisy actuator may cause a robot to translate faster or slower than desired).

As used herein, a kinematic response may correspond to a movement of a robot in response to a control signal communicated to one or more actuators of the robot. Typically, kinematic responses follow a kinematic model, as described in more detail below in FIG. 9.

As used herein, network interfaces may include any signal, data, or software interface with a component, network, or process, including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device, such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence or machine cognizable steps which perform a function. Such computer program and/or software may be rendered in any programming language or environment, including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments, such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing devices may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot or modular attachment for a robot. Myriad other embodiments or uses for the technology described herein would be readily envisaged by those having ordinary skill in the art, given the contents of the present disclosure.

Advantageously, the systems and methods of this disclosure may allow a robot to: (i) determine biases in parameters of the robot, such as navigation parameters useful for recreating a route due to biases in odometry and sensor units of the robot; (ii) more accurately recreate a route based on the determined biases; (iii) determine if the robot operates accurately and safely based on the variances of biases of the parameters of the robot; (iv) provide methods for distributed calculation of parameters yielding enhanced accuracy of determined or estimated values of the parameters; and (v) enable an operator to determine parameters of the robot while the operator is at a separate location or without directly observing/measuring parameters of the robot. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device, such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs").

Such digital processors may be contained on a single unitary integrated circuit die or distributed across multiple components.

Controller 118 may be operatively and/or communicatively coupled to memory 120. Memory 120 may include any type of integrated circuit or other storage device configured to store digital data, including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data in a specific way that enhances the functioning of memory 120 and robot 102. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments, different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators, such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; and rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on measurements. Such data may be stored in a specific manner in data structures, such as matrices, arrays, queues, lists, arrays, stacks, bags, etc. Such data gathering, collection, and filtering of the same may be performed in real time, which in-turn enhances functioning of robot 102.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to measure the odometry of robot 102. For example, sensor units 114 may include odometry units, which may comprise sensors, such as accelerometers, inertial measurement units ("IMU"), odometers, gyroscopes, speedometers, cameras (e.g. using visual odometry), encoders, clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments, user interface units 112 may be positioned on the body of robot 102. According to exemplary embodiments, user interface units 112 may be positioned away from the body of robot 102 but may be communicatively coupled to robot 102 (e.g., via communication units, including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies, such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards, such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller executing computer-readable instructions stored on a non-transitory computer readable storage apparatus, such as memory 120, as would be appreciated by one of ordinary skill in the art.

Figure 1B:
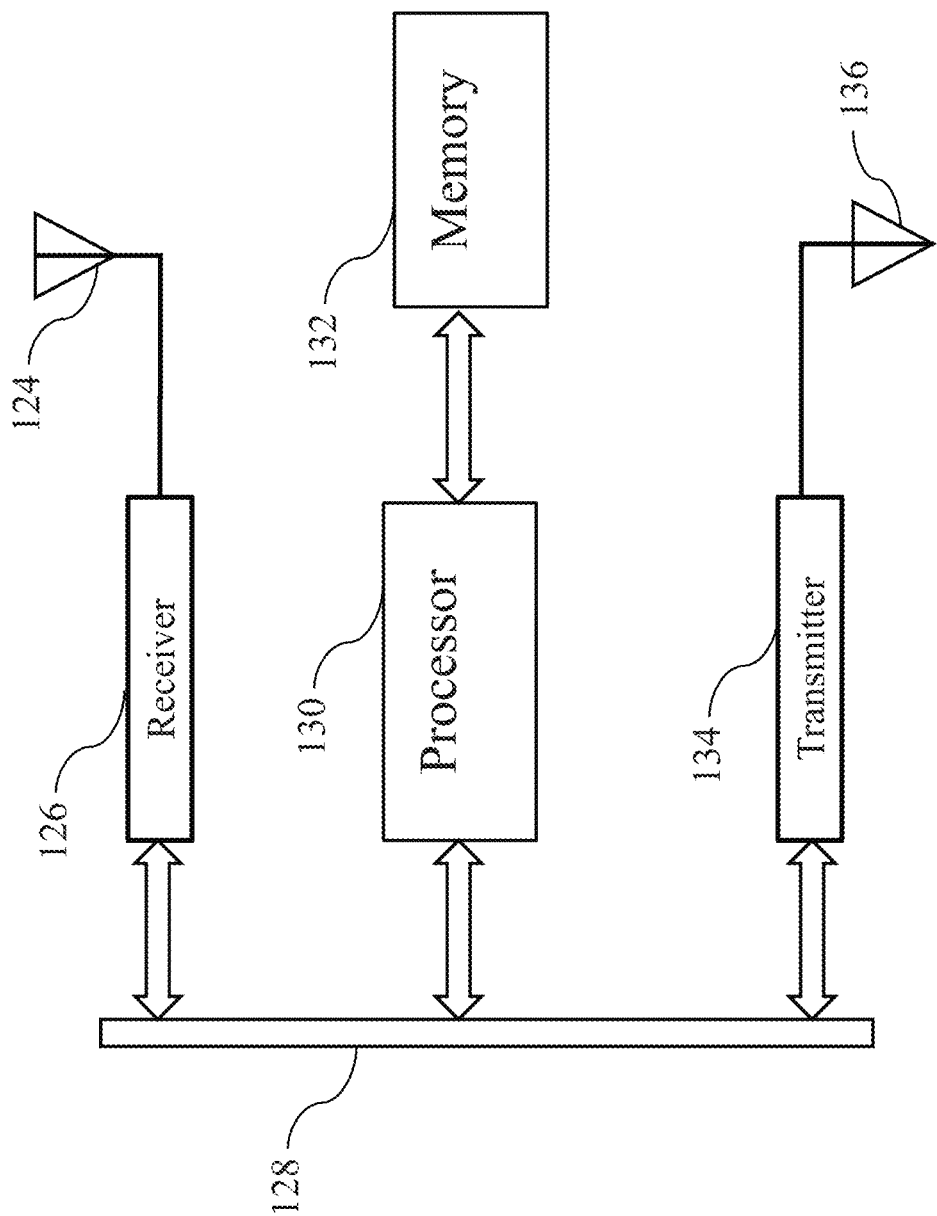
FIG. 1B is a functional block diagram of a controller or processor in accordance with some exemplary embodiments of this disclosure.

Next referring to FIG. 1B, the architecture of the specialized controller 118 used in the system shown in FIG. 1A is illustrated according to an exemplary embodiment. As illustrated in FIG. 1B, the specialized computer includes a data bus 128, a receiver 126, a transmitter 134, at least one processor 130, and a memory 132. The receiver 126, the processor 130 and the transmitter 134 all communicate with each other via the data bus 128. The processor 130 is a specialized processor configured to execute specialized algorithms. The processor 130 is configured to access the memory 132 that stores computer code or instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configured to receive input signals 124. The input signals 124 may comprise signals from a plurality of operative units 104 illustrated in FIG. 1A, including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processor 130 via the data bus 128. As one of ordinary skill in the art would appreciate, the data bus 128 is the means of communication between the different components—receiver, processor, and transmitter—in the specialized controller 118. The processor 130 executes the algorithms, as discussed below, by accessing specialized computer-readable instructions from the memory 132. Further detailed description as to the processor 130 executing the specialized algorithms in receiving, processing, and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, non-volatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136. Communication of such output signals results in unconventional results as disclosed herein.

One skilled in the art would appreciate that the architecture illustrated in FIG. 1B may illustrate an external server architecture configured to effectuate the control of a robotic apparatus from a remote location. That is, the server may also include a data bus, a receiver, a transmitter, a processor, and a memory that stores specialized computer readable instructions thereon.

Figure 2A:
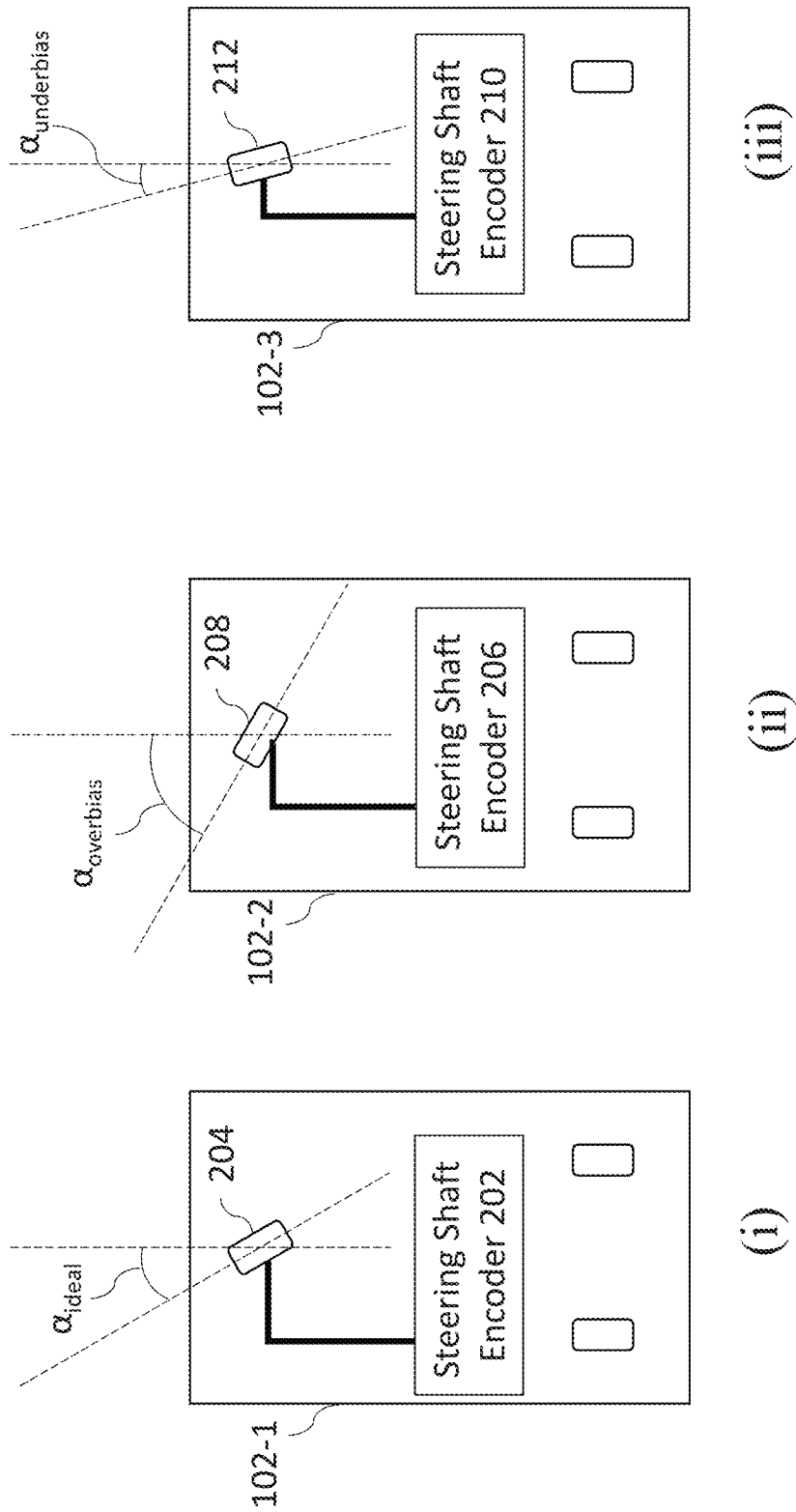
FIG. 2A is a top view of three robots to illustrate the terms bias, over bias, and under bias of measurement parameters in accordance with some exemplary embodiments of this disclosure.

FIG. 2A(i-iii) illustrates three robots 102-1, 102-2, and 102-3 which may comprise a steering shaft encoder 202, 206, and 210, respectively, configured to measure a steering angle α of a front wheel 204, 208, and 212, mounted on respective robots 102-1, 102-2, and 102-3, to illustrate over biases and under biases of measurement biases in accordance with some exemplary embodiments of the present disclosure. For illustrative purposes, all three robots 102-1, 102-2, and 102-3 in this embodiment comprise the exact same constituent components except for their steering encoders 202, 206, and 210 which comprise no bias, an over bias, and an under bias, respectively, as discussed further below. A steering shaft of a robot 102 may be turned by an actuator (not shown) coupled to the steering shaft, wherein the steering shaft encoder measures how much the actuator has turned the steering shaft to enable a controller 118, of a respective robot 102, to effectuate the control of the actuator based on the steering shaft encoder measurements. The controller 118 may emit a signal to the actuator coupled to the steering shaft, the signal configures the actuator to turn the steering shaft until the encoder reads a steering angle equal to a value specified by the controller 118 (e.g., $\alpha_{ideal}$) One skilled in the art would appreciate that turning of wheels 204, 208, and 212 to the left is shown for illustrative purposes only, as wheels 204, 208, and 212 are capable of turning left and/or right.

FIG. 2A(i) illustrates a robot 102-1 comprising a steering shaft encoder 202 configured to measure an angle a front wheel 204 of the robot 102-1 is turned, the turning being effectuated by controller 118 emitting signals to an actuator coupled to the steering shaft, wherein the signals configure the front wheel 204 to be turned by an angle $\alpha_{ideal}$. Upon the encoder 202 measuring the turn angle of the front wheel 204 equals $\alpha_{ideal}$, the encoder 202 may emit a signal to the controller 118 to configure the controller 118 to stop turning of the wheel (i.e., deactivate the steering shaft actuator), thereby positioning the front wheel 204 at the angle $\alpha_{ideal}$. The steering shaft encoder 202 of the robot 102-1 may comprise no measurement bias, thereby enabling the robot 102-1 to turn the front wheel 204 to the ideal steering angle $\alpha_{ideal}$. The ideal steering angle $\alpha_{ideal}$ may be determined, for example, by a controller of the robot 102-1 to execute a turning maneuver. The ideal steering angle $\alpha_{ideal}$ may further be used as a reference when determining measurement bias values of the steering encoders 206 and 210 of robots 102-2, and 102-3, respectively, and may comprise any angle (e.g., 5, 10, 20, 50, etc. degrees).

FIG. 2A(ii) illustrates a steering shaft encoder 206 of a robot 102-2, which is over biased, wherein measurements by the steering shaft encoder 206 are underestimated or are smaller than the real or actual turn angle of the front wheel 208. Thereby, causing the front wheel 208 of robot 102-2 to oversteer by a steering angle $\alpha_{overbias}$ larger than the ideal steering angle $\alpha_{ideal}$ due to the over bias (i.e., underestimation) of the steering encoder 206. Similarly, as illustrated in FIG. 2A(iii), the steering encoder 210 of robot 102-3 may be under biased, wherein measurements from the steering shaft encoder 210 are larger than the real measurements. Thereby, causing the front wheel 212 of robot 102-3 to understeer by a steering angle $\alpha_{underbias}$ less than the ideal steering angle $\alpha_{ideal}$ due to the under bias of the steering encoder 210. As illustrated in FIG. 2A (i)-(iii), turn angle $\alpha_{ideal}$ may be an ideal angle that front wheel of respective robot 102-1, 102-2, and 102-3 should make based on measurements from respective steering shaft encoders 202, 206, and 210. An angle that does not comport with the ideal turn angle $\alpha_{ideal}$ may either be an over bias angle $\alpha_{overbias}$ (i.e., larger than $\alpha_{ideal}$) or an under bias angle $\alpha_{underbias}$ (i.e., smaller than $\alpha_{ideal}$). A magnitude of a measurement bias of the steering shaft encoders 206 and 210 may be a magnitude of a difference between the ideal steering angle $\alpha_{ideal}$ and the measured steering angle $\alpha_{overbias}$ or $\alpha_{underbias}$. As such, although robots 102-2 and 102-3 may comprise steering encoders 206 and 210 that are configured to turn front wheels 208 and 212, respectively, by the ideal steering angle $\alpha_{ideal}$, such steering angle may be either under biased or over biased due to, for example, manufacturing defects or differences of the steering encoders or wear and tear over time.

One skilled in the art may appreciate that biases (e.g., over or under biases) may exist in any sensor, actuator, or component of a robot 102. For example, a LiDAR sensor may be mounted incorrectly on a robot 102 such that the pose of the LiDAR on the robot 102 comprises a 5 cm discrepancy along an x-axis from a default or ideal pose. Accordingly, measurements from this LiDAR may comprise a 5 cm bias, or constant error, along the x-axis. As another example, motors may be configured (e.g., by a part manufacturer) to rotate at a rate $\omega_0$ Hz when provided exactly 5 volts input. Some motors made by this manufacturer may, when provided with the same 5-volt input, be over biased, or rotate at a rate faster than $\omega_0$, and some may be under biased, or rotate at a rate slower than $\omega_0$, due to small electromechanical, material, electrical, etc. defects or differences. A magnitude of a bias may comprise a magnitude of a discrepancy between an ideal value (e.g., $\omega_0$, a default pose of the sensor, a value specified by controller 118, etc.) and a measured or actuated value. Biases are different from other forms of errors, as biases may remain substantially constant in time unless corrected or influenced by external factors (e.g., biases in a sensor of a robot 102 may remain constant unless an operator adjusts the sensor or the robot 102 collides with an object). Biases may be caused by a plurality of factors which may be complex to discern (e.g., noise within a transmitted signal, manufacturing defects, etc.); however, the systems and methods disclosed herein enable a robot 102 to measure biases of its constituent components in real time such that the biases may be accounted for and corrected to enable accurate and safe motion of the robot 102, wherein exact causes for biases is not required to account for them. In some instances, biases may be embodied in navigation parameters of a robot 102, causing the robot 102 to, for example, oversteer or understeer, wherein the oversteering or understeering may be caused by a bias in one or more sensor units. The one or more sensor units which comprise or cause the bias may, using the systems and methods discussed below, be determined.

Figure 2B:
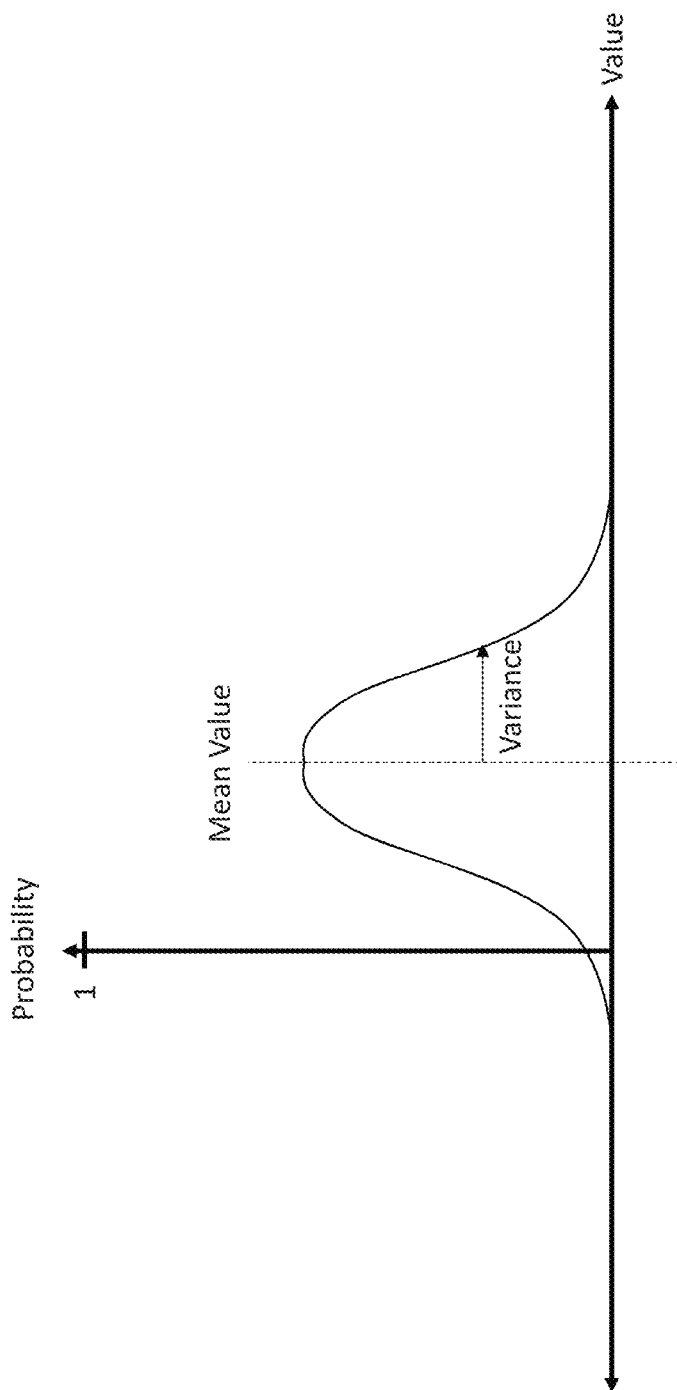
FIG. 2B is a probabilistic distribution and features thereof in accordance with some exemplary embodiments of this disclosure.

FIG. 2B illustrates an exemplary probability density function or probability distribution function (PDF) in accordance with some exemplary embodiments of the present disclosure. As used herein, a PDF may refer to a probability density function of a continuous random variable (e.g., velocity of a robot measured continuously) or a probability distribution function of a discrete variable (e.g., an aggregation of discrete samples of measurements from a sensor unit 114). It is appreciated that some probability distribution functions of discrete random variables are illustrated as continuous functions for clarity as probability distribution functions may be formed using a plurality (e.g., hundreds or more) of measurements of a random variable, wherein the probability distribution function of the discrete random variable may be approximated as a probability density function of continuous random variable (e.g., Gaussian approximation); however, this is not intended to be limiting. Robots 102 comprise of, at least in part, digital systems, such that all measurements are discrete (e.g., based on a CPU clock rate), wherein any PDF herein may comprise a probability distribution function approximated, using a plurality of samples of a random variable, as continuous probability density functions (e.g., Gaussian PDF).

A PDF of a random variable (e.g., a measurement form a noisy sensor) may comprise a distribution of values and probabilities associated to those values for the random variable, wherein a mean value is an expected value (E[x] or $\mu_x$ of random variable x) of the random variable. In some embodiments of a PDF of a random variable, the mean value may also comprise a value with highest probability associated thereto, such as a Gaussian PDF, as illustrated in FIG. 2B. According to at least one non-limiting exemplary embodiment, a PDF may comprise a Laplace distribution, a skewed distribution, a random distribution, a uniform distribution over a range of values, or any other form of a PDF. A PDF may further comprise a variance measure, wherein a large variance may correspond to a less predictable (i.e., more random) random variable. This is analogous to the random variable of the PDF potentially taking a wider range of possible values. Inversely, a smaller variance of a PDF of a random variable may correspond to the random variable comprising a more predictable set of possible values.

Measurements from sensors and odometry units collected over time may be random variables and be represented as a PDF as the measurements are subject to noise and/or biases. Noise, as used herein, may refer to Gaussian noise or zero mean noise for clarity; however, one skilled in the art may appreciate that the systems and methods may be applied to any form of noise (e.g., leakage currents, thermal or shot noise, frequency dependent noise, flicker noise, etc.) and is not intended to be limiting to zero mean noise. By way of illustrative example, consider an unbiased LiDAR sensor measuring distance to an object 10 feet away. If the LiDAR sensor is noisy (e.g., due to ambient background radiation), the measurements may randomly deviate from the 10 feet ground truth, wherein all measurements from this sensor may be represented by a PDF with a large variance and mean value of 10 feet. If the LiDAR sensor is less noisy, the measurements represented in a PDF may comprise a smaller variance and a mean value of 10 feet. If the LiDAR sensor comprises a bias, the mean value of the PDF will shift or be different from the 10 feet value of the ground truth accordingly.

Noise in measurements may be caused by a plurality of parameters, including, but not limited to, random thermal noise, precision level or resolution of a measurement instrument, background radiation, leakage currents, and/or other imperfections (e.g., bumps in a floor causing a sensor/odometry unit measurement to vary slightly, imperfections in the sensor and odometry units, etc.).

By way of illustrative example, referring to FIG. 2A(i), a first steering encoder 202 may desire to turn a steering shaft by an angle of $\alpha_{ideal}$, wherein $\alpha_{ideal}$ may be determined to be the ideal steering angle for the ideal encoder to turn the steering shaft. Measurements made by the first steering encoder may comprise no measurement bias but may comprise noise, wherein the measurements received from the first steering encoder may follow a PDF due to the noise. The measurements of the first steering encoder comprising no measurement bias may be centered about a mean value of for example, as shown in FIG. 2A(i). In this example, the steering angle of the front wheel 204 effectuated by the noisy and unbiased steering shaft encoder 202 may, on average, be angle $\alpha_{ideal}$ but may deviate slightly and randomly from the $\alpha_{ideal}$ due to the noise over repeated attempts at turning the front wheel 204 by $\alpha_{ideal}$. A second steering encoder comprising a measurement bias, as illustrated in FIG. 2A(ii-iii), may attempt to steer a steering shaft by $\alpha_{ideal}$; however, due to the measurement bias of the second steering encoder, the steering shaft may turn by an angle $\alpha_{bias}$ different (e.g., larger or smaller) than $\alpha_{ideal}$. The measurements of the steering angle received by the second steering encoder may further be represented as a PDF comprising a variance about the mean value due to noise. The measurements of the second steering encoder, as viewed from the perspective of the second steering encoder, may comprise a PDF with a mean value centered about a mean value of $\alpha_{ideal}$. However, an observer observing or measuring the actual steering angle of the steering shaft would position the mean value at $\alpha_{bias}$ due to the measurement bias of the second encoder causing the second encoder to perceive a steering angle of $\alpha_{ideal}$ when in actuality the steering shaft is turned by an angle $\alpha_{bias}$. Accordingly, measurements from a sensor unit 114 in many instances may not be utilized to determine biases of the sensor unit 114 and must be referenced to a ground truth or with respect to other unbiased sensor units 114. The noise of the first encoder and the second encoder may arise from substantially similar parameters thereby causing the variance of the two PDFs of measurements from the two encoders to be substantially similar.

Figure 2C:
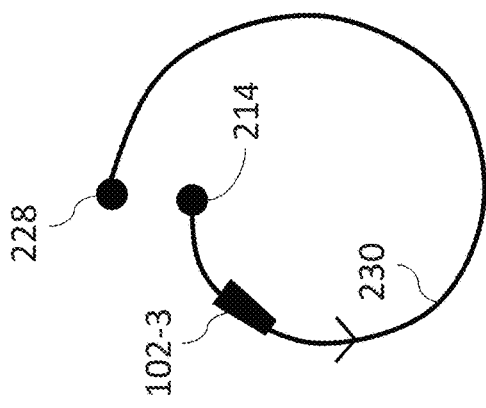
FIG. 2C is atop view of three robots to illustrate biases in navigation parameters caused by biases in measurement parameters, in accordance with some exemplary embodiments of this disclosure.
Figure 2C:
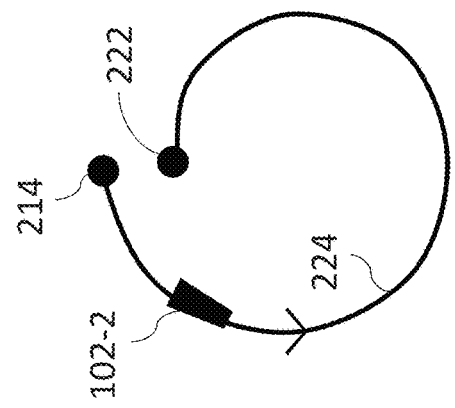
Figure 2C:
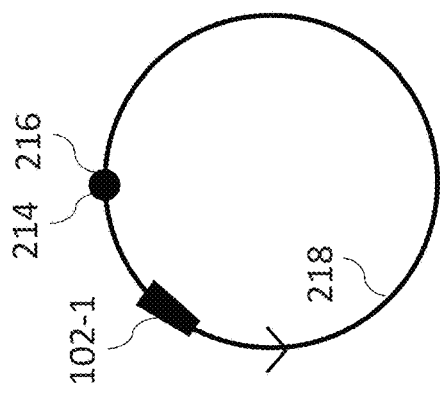
Figure 2C:
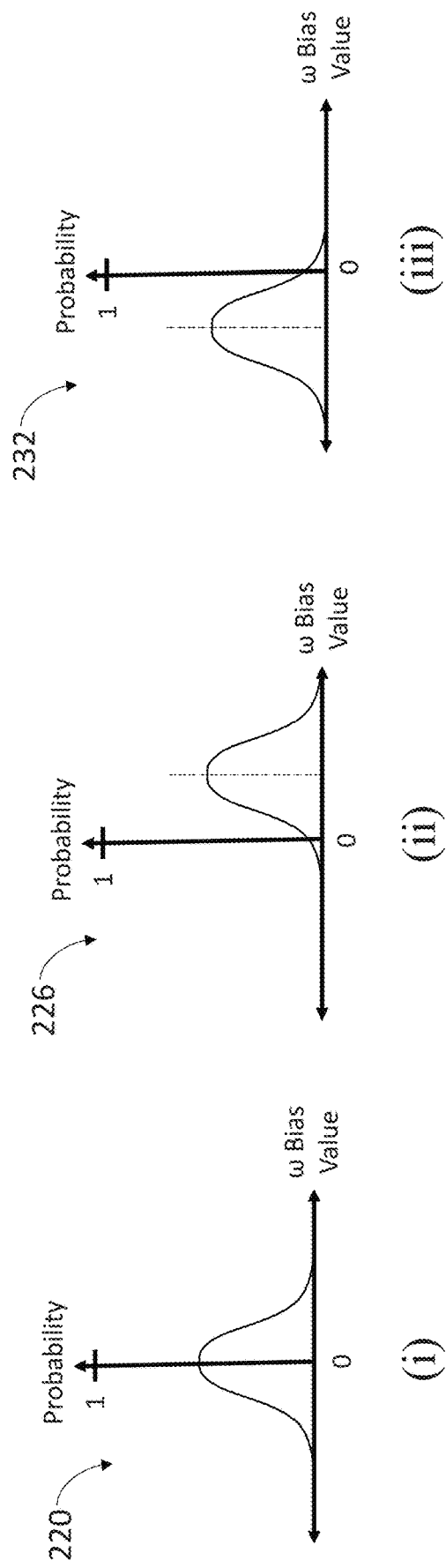

FIG. 2C(i-iii) illustrates robots 102-2 and 102-3, comprising navigation parameter biases with respect to angular velocity ω, attempting to recreate a route 218 navigated by a robot 102-1, comprising no navigation parameter biases, to illustrate the effect of measurement biases on a navigation parameter w in accordance with some exemplary embodiments of this disclosure. Navigation parameters may comprise any parameters associated with navigating a robot 102 along a route, including, for example, angular velocity ω, linear velocity v, direction of motion, and/or other state space parameters. Biases in navigation parameters may be caused by biases of one or more sensor units 114 and/or actuator units 108 of a robot 102. The navigation parameter illustrated in FIG. 2C is angular velocity ω, wherein one skilled in the art would appreciate other navigation parameters may be utilized by the robots 102-2 and 102-3 to recreate the route 218 navigated by the robot 102-1, such as, for example, linear velocity. It may be assumed, for the purpose of illustration, that all robots 102-1, 102-2, and 102-3, illustrated in FIG. 2C(i-iii) may comprise unbiased speedometers such that all three robots 102-1, 102-2, and 102-3 navigate the route at a same speed. The robots 102-2 and 102-3, however, may comprise measurement biases in, for example, steering shaft encoders of the robots 102-2 and 102-3, as illustrated in FIG. 2A(ii-iii), thereby causing a bias in the angular velocity ω navigation parameter of the robots 102-2 and 102-3.

FIG. 2C(i) illustrates a robot 102-1 navigating a route 218 comprising a start point 214 and an end point 216, according to an exemplary embodiment. Route 218 may be executed by the robot 102-1 by the robot 102-1 rotating (i.e., steering) at a constant angular rate while moving with a constant translational velocity. For the sake of illustration, all robots 102-1, 102-2, and 102-3 may comprise ideal and unbiased speedometers such that their translational velocities are the same during attempted recreation of route 218. Data comprising the route 218 (i.e., computer readable instructions executable by controller 118 to recreate the route 218) may be communicated to the robot 102-1 from an operator via wireless or wired communication prior to the robot 102-1 navigating the route 218. The robot 102-1 may comprise no measurement biases in its sensor units 114 and/or actuator units 108. It is appreciated that, for illustrative purposes, a controller 118 of each robot 102-1, 102-2, and 102-3 may execute the same sequence of computer readable instructions to recreate route 218 and output the same control signals to actuator units 108 to effectuate navigation of the route 218.

Due to the lack of measurement biases in the sensor and odometry units, the robot 102-1 may steer at the desired constant angular rate, thereby navigating the route 218. That is, due to sensor units 114 and actuator units 108 of the robot 102-1 being well calibrated and comprising no biases, the robot 102-1 is able to complete the route 218 perfectly.

Measurements from the actuator units 108 and sensor units 114 units of robot 102-1 may still comprise noise due to, for example, random thermal noise. Accordingly, a PDF 220 of angular velocity ω values of the robot 102-1 may be centered about a bias value of zero (0), corresponding to no navigation parameter bias with respect to angular velocity ω. That is, the mean value of PDF 220 comprising a value of zero (0) corresponds to the angular velocity ω of the robot 102-1 during navigation of route 218 comprising no bias or error. Due to the lack of navigation parameter bias with respect to angular velocity ω, the start point 214 and the end point 216 of the route 218 traveled by the robot 102-1 may be at the same location as the route 218 is a perfect circle in this exemplary embodiment.

In FIG. 2C(ii), a robot 102-2 may attempt to navigate the route 218, wherein the same data (i.e., computer readable instructions) comprising the route 218 given to the robot 102-1 may be communicated to the robot 102-2 from an operator, external server, or from robot 102-1 via wired or wireless communication prior to the robot 102-2 attempting to navigate the route 218. Robot 102-2, however, may comprise uncalibrated sensor units 114 and/or imperfect actuator units 108. For example, robot 102-2 may comprise an over biased steering shaft encoder 206 causing the robot 102-2 to oversteer. The measurement bias in the steering shaft encoder 206 may cause the angular velocity ω of the robot 102-2 to be over biased when attempting to recreate route 218, thereby causing the robot 102-2 to turn at a faster rate than desired (e.g., faster than robot 102-1). Accordingly, robot 102-2 may navigate a route 224, while attempting to recreate route 218, comprising a start point 214 and end point 222, at a different position from end point 216 due to oversteering caused by the over biased angular velocity ω, wherein robot 102-2 would desire to have the end point 222 at the location of end point 216 (e.g., at the same location as the start point 214). Additionally, as shown by PDF 226, the mean bias value of the probabilistic distribution of bias values for angular velocity ω (illustrated by a dashed line) of the robot 102-2 may be over biased, as the mean bias value is larger than zero (0), thereby causing the robot 102-2 to turn with an angular velocity larger than desired due to the greater than zero bias.

Similarly, FIG. 2C(iii), a robot 102-3 may attempt to navigate the route 218, wherein the same data comprising the route 218 given to the robot 102-1 may be communicated to the robot 102-3 from an operator, external server, or robot 102-1 via wired or wireless communication prior to the robot 102-3 attempting to navigate the route 218. Robot 102-3, however, may comprise imperfect or uncalibrated sensor units 114 and/or actuator units 108, wherein robot 102-3 may comprise an under biased steering shaft encoder 210 causing the robot 102-3 to understeer. The measurement bias in the steering shaft encoder 210 may cause the angular velocity ω navigation parameter of the robot 102-3 to be under biased or of a smaller mean value, thereby causing the robot 102-3 to turn at a slower rate than desired (e.g., slower than robot 102-1). Accordingly, robot 102-3 may navigate a route 230, while attempting to recreate route 218, comprising a start point 214 and end point 228, at a different position from end point 216 due to understeering caused by the under biased angular velocity ω, wherein robot 102-3 would desire to have the end point 228 at the location of end point 216 (e.g., at the same location as the start point 214). Additionally, as shown by PDF 232, the mean bias value for angular velocity ω (illustrated by a dashed line) of the robot 102-3 may be under biased, as the mean value of the PDF of bias values is less than zero (0), thereby causing the robot 102-3 to turn with an angular velocity smaller than desired.

It is appreciated that PDFs 220, 226, and 232 comprise a nonzero variance due to sensor units 114 and/or actuator units 108, which effectuate navigation of the route 218 in response to signals from controller 118, being subject to noise.

According to at least one non-limiting exemplary embodiment, robots 102-2 and 102-3 may be illustrative of a robot 102-1 at a later duration in time wherein robot 102-1, at the later duration in time, may comprise measurement biases, and therefore navigation parameter biases, due to sensors and odometry units becoming uncalibrated over time. The sensors and odometry units may become uncalibrated over time due to, for example, wear and tear over time or collisions with obstacles. According to at least one non-limiting exemplary embodiment, a bias in the angular velocity ω navigation parameter of a robot 102 may be caused by measurement biases in one or more sensor and/or odometry units, wherein measurement biases of the steering shaft encoders 206 and 210 of the robots 102-2 and 102-3, respectively, causing navigation parameter biases, with respect to angular velocity ω are not intended to be limiting. One skilled in the art may appreciate that typical biases in navigation parameters may be caused by a plurality of biases and/or imperfections in at least one operative units 104 of robot 102, wherein a single biased instrument or sensor is described herein for clarity.

According to at least one non-limiting exemplary embodiment, the route 218 may not be a circular route and may comprise additional turns, wherein the routes 224 and 230 recreated by the biased robots 102-2 and 102-3, respectively, may comprise the additional turns; however, the additional turns in the recreated routes 224 and 230 may be sharper or wider due to biases in the angular velocity ω navigation parameter. In other words, the routes 218, 224, and 230, as illustrated, are not intended to be limiting; rather, they are intended to illustrate a simple circular route and a single navigation parameter w. Other more complex routes may require additional navigation parameters to recreate, wherein the biases of the additional navigation parameters may be determined and corrected using systems and methods illustrated in the below figures.

One of ordinary skill in the art would appreciate that FIG. 2C is illustrative of only one navigation parameter useful to a robot to recreate a route 218. Navigation parameter biases may be observed in other navigation parameters, such as, for example, translational velocity, distance measurements (e.g., for localization of robot 102), and/or other parameters useful for recreating the route 218. The biases in navigation parameters may be observed due to measurement biases in one or more sensor and/or odometry units of a robot 102 and actuator units 108. Accordingly, the systems and methods of the present disclosure may enhance the ability of a robot 102 to calculate these biases in navigation parameters and account for them while recreating the route 218, and/or other routes.

Figure 3:
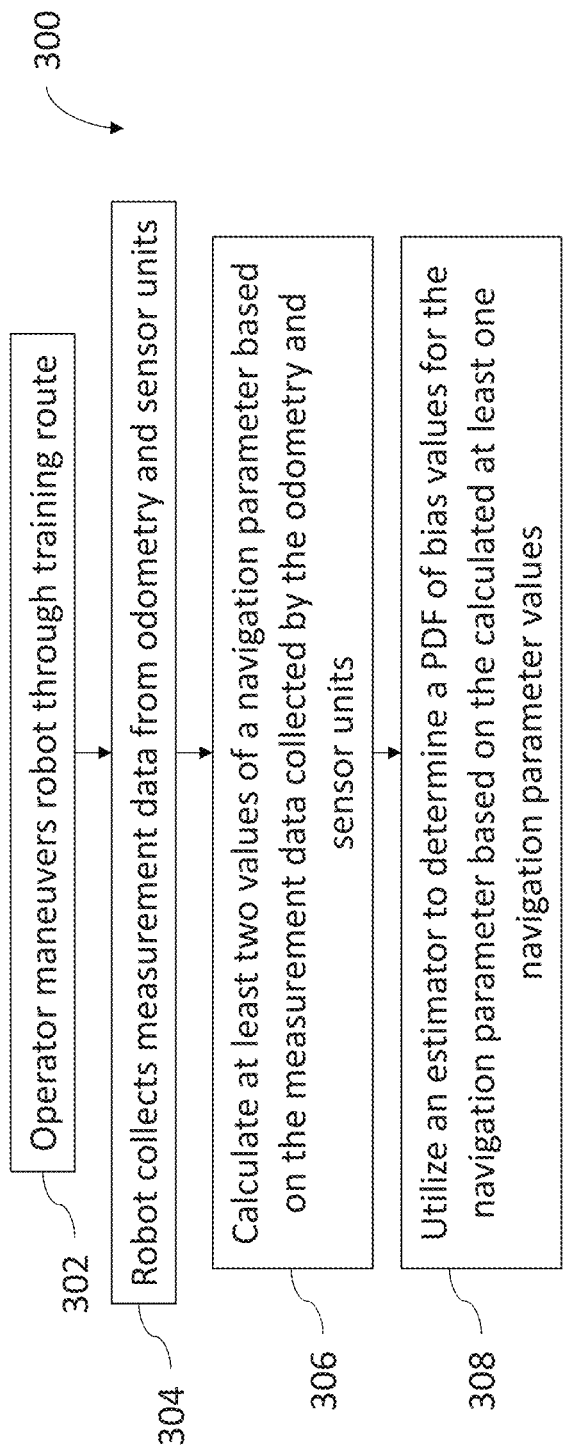
FIG. 3 is a process flow diagram of a method for a controller of a robot to determine a bias in a parameter useful for recreating a training route, according to an exemplary embodiment.

FIG. 3 illustrates a process flow diagram illustrating a method 300 for a controller 118 of a robot 102 to determine a PDF for bias values for a navigation parameter, according to an exemplary embodiment. As mentioned above, a navigation parameter may comprise a parameter of the robot 102 useful for navigating or recreating a route, including, for example, liner velocity, angular velocity, acceleration, state space parameters, and/or position relative to an origin. Navigation parameters of a robot 102 may be based on one or more operative units 104 as appreciated by one skilled in the art (e.g., translational velocity may be based on power to an actuator unit 108 and/or readings from a wheel encoder of sensor units 114). The PDF for bias values for the navigation parameter may be used by robot 102 to calibrate its odometry and sensor units 114 to recreate a training route taught by an operator by accounting for the navigation parameter bias corresponding to a mean of the PDF. Although detailed descriptions and formulae may relate to determining a probabilistic distribution of bias values of an angular velocity navigation parameter w of the robot 102, one of ordinary skill in the art would appreciate that a substantially similar method may be observed to determine other navigation parameters of the robot using different formulae. It is appreciated that any steps performed by a robot 102 or controller 118 of method 300 may be effectuated by the controller 118 of the robot 102 executing computer readable instructions from memory 120.

Block 302 illustrates an operator navigating the robot 102 through a training route. The training route may comprise a route for the robot 102 to learn and recreate based on sensor and odometry data collected during navigation of the route, as illustrated block 304. To recreate the training route, however, the robot 102 must determine values of biases of the navigation parameters of the robot 102, due to biases of the sensor and odometry units, and account for these biases in recreation of the training route. According to at least one non-limiting exemplary embodiment, an operator may enable a training mode for a robot 102, causing the robot 102 to learn a training route by following the operator, being driven by the operator, being pushed or pulled by the operator, and/or any other form of moving the robot 102 through a route while collecting data from any or all sensors units 114 of the robot 102.

Block 304 illustrates the controller 118 of the robot 102 collecting measurement data from the sensor units 114 of the robot 102. The sensor units 114 may comprise exteroceptive sensors (e.g., LiDAR, depth cameras, imaging cameras, etc.) or internal sensors (e.g., gyroscopes, accelerometers, encoders, etc.) as illustrated above in FIG. 1A. The measurement data may comprise measurements of parameters, including, but not limited to, distance measurements to nearby objects, position relative to an origin, image data, gyroscopic measurements, accelerometer measurements, and/or encoder data. The controller 118 may store the measurement data generated by the sensors units 114 in memory 120, as illustrated in FIG. 1A, in the form of an array, buffer, matrix, and/or any other data structure.

Block 306 illustrates the controller 118 calculating at least two values of a navigation parameter, used to recreate the training route, based on the measurement data collected by the sensor units 114 in block 304. The controller 118 may utilize the measurement data from one or more sensor units 114 to calculate the at least one value of the navigation parameter, wherein the at least one calculated values of the navigation parameter may follow a PDF due to noise of the measurement units.

By way of an illustrative non-limiting example, the navigation parameter may be an angular velocity ω parameter of a robot 102. The at least one values of the navigation parameter w calculated by the controller 118 may be calculated using measurement data gathered by a gyroscope; a planar LiDAR sensor, configured to detect nearby objects and measure the distance to the nearby objects; one or more encoders; and/or other sensor units 114 of the robot 102. The gyroscope may measure a first value for angular velocity $\omega_{gyro}$ at a location along the training route, wherein the $\omega_{gyro}$ may further comprise a time-dependent measurement bias and a noise parameter following Equation 1:

$$\omega_{gyro} \propto \text{bias}(t) + \text{noise} + \omega_0 \qquad \text{Eqn. 1}$$

Equation 1 illustrates angular velocity of gyroscope being proportional to bias and noise, wherein bias is a function of time (t) and may comprise a positive or negative value. The value $\omega_0$ represents a desired value for ω of the robot 102 absent noise and biases. The time-dependent measurement bias of a gyroscope, as well as some other odometry units, may be determined using the methods illustrated below in FIG. 5. Biases may change over time due to, for example, wear and tear, temperature fluctuations, and/or other mechanical changes to the robotic system over time. The "noise" parameter may comprise any noise source. The noise parameter may be caused, for example, due to random thermal noise, inaccuracy or resolution of the gyroscope, and/or bumps in the floor upon which the robot 102 is navigating which cause the gyroscope measurement to fluctuate randomly. Due to the value of the noise parameter varying randomly, $\omega_{gyro}$ may therefore be represented by a PDF based on the random distribution of the noise parameter. Additionally, the mean value of the probabilistic distribution of $\omega_{gyro}$ may be based on the value of the time-dependent bias of the gyroscope. The calculation of $\omega_{gyro}$ may further comprise additional terms relating properties of the gyroscope with angular velocity, which have been omitted for simplicity.

The controller 118 may calculate a second value of the at least one values for the angular velocity ω of the robot 102 based on a steering shaft encoder (e.g., steering shaft encoders 202, 206, or 210 illustrated above in FIG. 2A) and wheel encoder of the robot 102 following Equation 2:

$$\omega_{steering} = \sin(\alpha_{steering}) \times \frac{V_{steering}}{d} \qquad \text{Eqn. 2}$$

The parameter $\omega_{steering}$ corresponding to a measured value of w using the steering shaft encoder and wheel encoders. $V_{steering}$ may be a velocity measure of the robot 102 calculated based on the wheel encoder data (e.g., multiplying the number of rotations of a wheel by a known radius of the wheel and dividing by time) or based on data from other sensor units 114 (e.g., using a LiDAR to track relative motion of stationary objects). The wheel encoder measurements may comprise noise and therefore the measurements of the velocity measure $V_{steering}$ from the noisy wheel encoder may follow a PDF with nonzero variance. The wheel encoder measurements may further comprise a measurement bias, as illustrated in FIG. 2A above. Steering angle $\alpha_{steering}$ may be measured by the steering shaft encoder, wherein the measurements of the steering shaft encoder may also comprise noise and a measurement bias.

The value of d being a fixed, known constant value of a parameter of the robot 102 (e.g., wheel separation for a three wheeled robot, such as the robots illustrated in FIG. 2A) may therefore comprise no noise or bias. Accordingly, measurements of $\omega_{steering}$ using and wheel the steering shaft wheel encoders may follow a PDF due to its dependent parameters $\alpha_{steering}$ and $V_{steering}$ being subject to noise and/or biases.

The navigation parameter, in this example ω, may be measured using data from a plurality of operative units 104 of the robot 102 similar to the above two examples. As a third example, the controller 118 may further utilize the planar LiDAR sensor of the robot 102 to calculate a third value $\omega_{LiDAR}$ based on relative motion of nearby objects observed by the LiDAR sensor as the robot 102 executes a turn, wherein the LiDAR sensor measurements may comprise noise (e.g., due to thermal fluctuations) and a bias (e.g., due to imperfect mounting or calibration), causing $\omega_{LiDAR}$ to also follow a PDF with nonzero variance. Determining motion of a robot 102 using LiDAR scans may be performed using iterative closest point (ICP) and/or pyramid scan match algorithms between subsequent scans of the LiDAR sensor as part of standalone laser odometry (SLO).

In other words, the controller 118 may calculate a plurality of values for a navigation parameter, such as the three ω values, as illustrated above, and/or other values based on data collected by the sensor units 114 and predetermined equations or models, wherein each of the plurality of calculated navigation parameter values $\omega_{gyro}$, $\omega_{steering}$, and $\omega_{LiDAR}$ may be random variables following a PDF due to the noise of the measurement units used to measure the parameter values. The PDFs of the calculated values of the navigation parameter may further comprise a mean value based on measurement biases of the measurement units. It is appreciated by one of ordinary skill in the art that data from a plurality of different measurement units may be used to calculate a value of a navigation parameter using a substantially similar method and different formulae as illustrated above, wherein each calculated value may follow a PDF due to noise of the measurement units and may be centered about a mean value based on measurement biases of the instruments used to measure or calculate the values.

It is appreciated that the above equations 1-2 illustrate equations for calculating values of ω based on measurements from one or more sensor units 114 of the robot 102. To determine a PDF of values for w using any of the above equations, the controller 118 may execute the above equations to sample a plurality of measurements of w over time, such that a PDF may be formed using the plurality of measurements. For example, as robot 102 is navigated through the training route and collects data in block 304, controller 118 may measure $\omega_{gyro}$, $\omega_{steering}$, and $\omega_{LiDAR}$ one hundred (100) times per second (i.e., 100 Hz) using the above equations to form the PDF for $\omega_{gyro}$, $\omega_{steering}$, and $\omega_{LiDAR}$. These PDFs $\omega_{gyro}$, $\omega_{steering}$, and $\omega_{LiDAR}$ may then be combined using an estimator 406, further discussed below in FIG. 4A-C, to generate a single PDF for w, or an estimation of an actual angular velocity executed by the robot 102. A PDF of bias values for w, or any other navigation parameter, may correspond to a PDF representing a deviation of w, or angular velocity effectuated or actually executed by the robot 102, from an ideal $\omega_0$, or desired angular velocity specified by controller 118, due to noise and/or biases of sensor units 114. PDF of bias values of a navigation parameter may be normalized with respect to the ideal value of the navigation parameter to account for the training route comprising, for example, leftward and rightward turns. That is, a PDF of bias values for a parameter comprise a PDF representing a deviation of the parameter from an ideal or ground truth value as the robot 102 executes the route.

According to at least one non-limiting exemplary embodiment, some sensors and/or odometry units may be configured to measure a value of a navigation parameter directly without additional processing or formulae. For example, an accelerometer may measure the acceleration of a robot directly, wherein acceleration of the robot 102 may be useful in recreating the training route and may therefore be considered a navigation parameter. Acceleration may also be calculated based on current drawn by an actuator unit 108, gyroscopic measurements, and LiDAR scans with respect to stationary objects, and so forth. Reliance on just the accelerometer to measure a value of a navigation parameter, however, may cause the robot 102 to be increasingly susceptible to noise and/or biases of the accelerometer, wherein use of at least one additional measurement from at least one other sensor unit 114 may drastically reduce this susceptibility to the noise and/or bias thereby yielding a more robust robotic system.

According to at least one non-limiting exemplary embodiment, a controller 118 may utilize some calculations of values of a first navigation parameter to calculate values of a second, different navigation parameter. For example, data from a front wheel encoder may be utilized to determine values of translational velocity (a navigation parameter), wherein the translational velocity values may be utilized to determine an angular velocity (another navigation parameter) based on additional data from a steering shaft encoder (e.g., the turn angle of the robot 102), as illustrated in equation 2 above. As another example, calculations of values for translational velocity of a robot 102 over time may comprise a single method, among others, for calculating a value for acceleration of the robot 102.

Block 308 illustrates the controller 118 utilizing an estimator 406, as illustrated below in FIG. 4, to determine a PDF of bias values for the navigation parameter based on the calculated at least one values of the navigation parameter calculated in block 306. The estimator 406 may utilize specialized algorithms stored in memory 120 to determine the PDF of the bias values for the navigation parameter based on the navigation parameter values calculated in block 306.

Following the above example, where the navigation parameter ω is being calculated, the estimator 406 may receive PDFs of $\omega_{gyro}$, $\omega_{steering}$, and $\omega_{LiDAR}$ using equations 1, 2, and/or other equations based on other sensor units 114 by measuring values for $\omega_{gyro}$, $\omega_{steering}$, and $\omega_{LiDAR}$ over time as the robot 102 is moved through the training route. The estimator 406 may output a single PDF of bias values for the angular velocity ω based on the three, or more, PDFs for $\omega_{gyro}$, $\omega_{steering}$, and $\omega_{LiDAR}$.

According to at least one non-limiting exemplary embodiment, method 300, or portions thereof (e.g., blocks 304-306), may be repeated after a prescribed duration of time (e.g., every 1 second, 5 seconds, 1 millisecond, etc.), wherein the duration may be communicated to a robot 102 via a user interface unit 112, a wired connection, or a communications unit 116 communicating with an external server. According to at least one non-limiting exemplary embodiment, method 300 is performed after the robot 102 has completed the training route as a method for calibrating sensor units 114 and accounting for biases in the sensor units 114 during recreation of the training route at a later time.

According to another non-limiting exemplary embodiment, a controller 118 may calculate the PDF of navigation parameter bias values at designated locations along the training route and/or at designated locations during recreation of the training route. For example, the controller 118 may calculate the PDF of a bias of a navigation parameter every two (2) meters or feet along a route. Measurements at such intervals is arbitrary and may be adjusted by a user or manufacturer of robot 102 as necessary.

Advantageously, calculating a PDF of bias values for any navigation parameter (e.g., angular velocity ω, translational velocity, acceleration, etc.) may be essential for a robot 102 to recreate a route using only sensor and odometry data. For example, if a robot 102 determines the angular velocity ω is over biased, denoted by a mean value of a PDF of bias values for ω being greater than zero as determined by an estimator 406, the robot 102 may correct for this bias by understeering, wherein the degree to which the robot 102 understeers may be based on the mean value of the PDF. Additionally, if the PDF of bias values determined by the estimator comprises small variance, the robot 102 may more accurately recreate the training route as the robot 102 may more accurately determine a magnitude of a bias of a navigation parameter to be accounted for during recreation of the route. Similarly, if the PDF of bias values determined by the estimator 406 comprises a large variance, it may be determined that a robot 102 may comprise one or more poorly calibrated, very biased, or very noisy sensors and/or odometry units. Additionally, using a distributed form of data collection from a plurality of odometry and sensor units may enhance the ability of a controller 118 of a robot 102 to more accurately (e.g., with less variance) determine bias values of a navigation parameter, and thereby more accurately recreate a training route, by removing a reliance of the controller 118 on measurements from a single sensor units 114.

One skilled in the art would appreciate that a method substantially similar to method 300 may be utilized to determine any parameter of a robot 102 using sensor and odometry data. For example, a mass of a robot 102 may be calculated using force sensors, energy consumption of wheel actuators, torque on wheels, and data from additional sensor and odometry units using different formulae readily discernable by one skilled in the art. Additionally, one skilled in the art would appreciate steps illustrated in blocks 306, and 306 may be performed by a processor of an external server, wherein a robot 102 may communicate sensor and odometry data to the server to be used to calculate at least one value of a parameter of the robot 102 to be utilized by an estimator 406, illustrated below in FIG. 4A-B, to determine a PDF of bias values for the parameter of the robot 102.

Figure 4A:
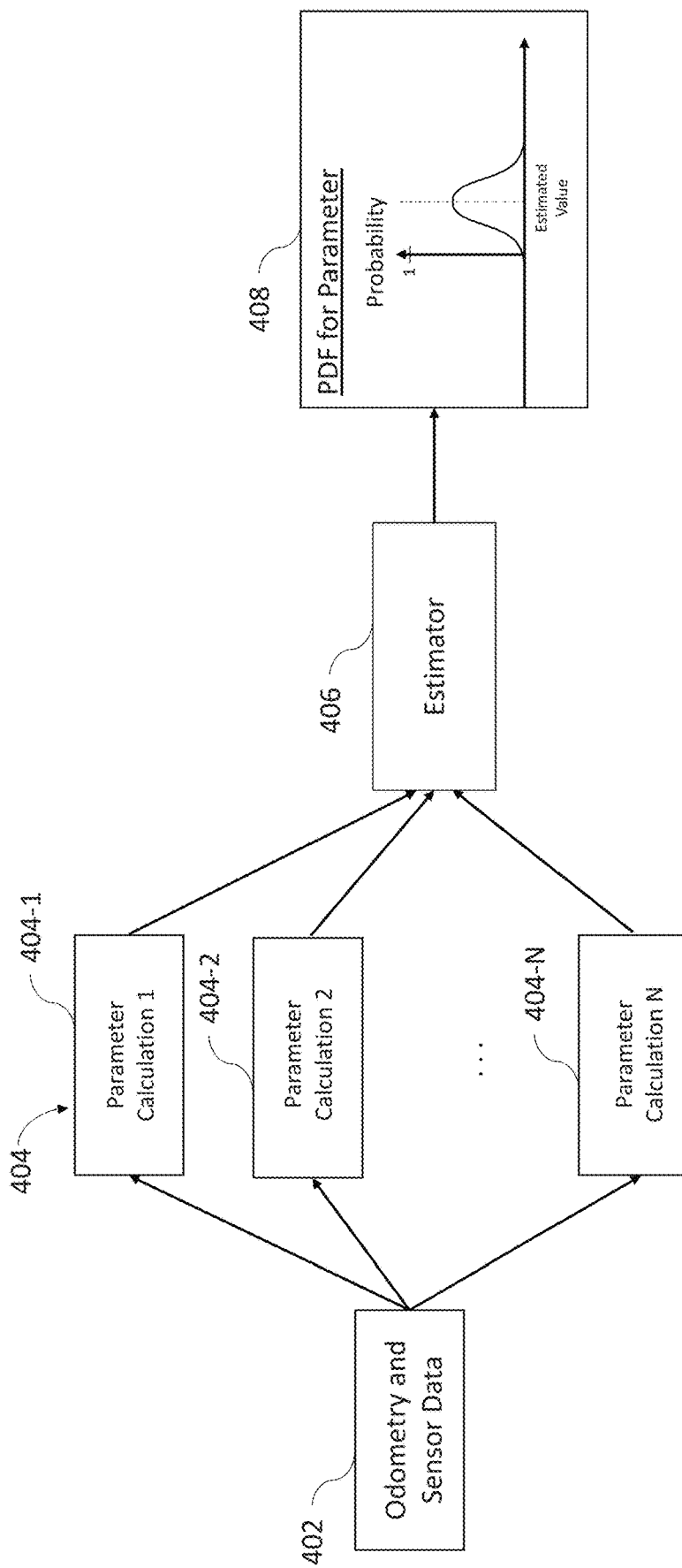
FIG. 4A is a functional block diagram of a system configured to determine a probabilistic bias distribution of a parameter useful for recreating a training route, according to an exemplary embodiment.

Next, FIG. 4A is a functional block diagram of a system configured to utilize odometry and sensor data 402 to determine a PDF of bias values 408 of a parameter of a robot 102, according to an exemplary embodiment. The parameter may be, for example, a navigation parameter (e.g., angular velocity, translational velocity, localization based on distance measurements by one or more sensors, acceleration, state space measurements/parameters) or other parameters, such as mass (e.g., of robot 102 and/or any attached payloads), size, power consumption, and/or any other parameter which may be calculated using measurements from one or more sensor units of the robot 102.

Odometry and sensor data 402 may comprise data from sensor units 114 of a robot 102 illustrated above in FIG. 1A. In some embodiments, odometry and sensor data 402 may comprise a stream of captured data from sensor units 114. In some embodiments, odometry and sensor data 402 may comprise of data collected by sensor units 114 during navigation of a route stored in memory 120. The odometry and sensor data 402 may comprise noise, and each of the odometry and sensor units generating data 402 may further comprise a measurement bias. The odometry and sensor data 402 may be used to calculate at least one parameter value using each parameter calculation blocks 404. Each of the parameter calculation blocks 404 may utilize data 402 from at least one sensor unit 114 to determine a value of the parameter in accordance with a predetermined model which relates the input data from the at least one sensor unit 114 to an estimated value of the parameter. That is, each parameter calculation block 404 may calculate a value for the navigation parameter using one of the equations 1 or 2 above, or other predetermined models discernable by one skilled in the art. As additional measurements or calculations of the parameter are performed (e.g., collected over time), the calculated values of the parameter may form a PDF due to noise and/or biases of sensor units 114 causing the calculated values to vary with respect to each other. The parameter calculation blocks 404 may be a separate operative unit (e.g., a hardware calculation accelerator) or may be illustrative of a controller 118 executing computer readable instructions stored in memory 120 to perform the operations of the parameter calculation blocks 404.

For example, a parameter calculation block 404-1 may use data from a gyroscope to calculate a value for angular velocity ω following equation 1 above, wherein the calculated value may be a random variable following a PDF comprising a variance, due to noise from the gyroscope measurements, and a mean value, wherein the mean value may further comprise a bias due to a measurement bias of the gyroscope. A parameter calculation block 404-2, for example, may utilize data from a steering shaft encoder to calculate a second value for the angular velocity following equation 2 above, wherein the second calculated angular velocity value may also follow a PDF for substantially similar reasons (e.g., biases and noise in the encoder). The values of the parameter calculated by each block 404 may be different if the data 402 is measured from sensor units 114 comprising noise and/or biases. This process may be executed a plurality of times, as noted by N parameter calculation blocks 404 to calculate N values of the parameter using N separate formulae, wherein index N may be any non-zero integer number corresponding to the number of calculations of the navigation parameter. The output of the parameter calculation blocks 404, comprising calculated values for the parameter, may be passed to an estimator 406.

The estimator 406 may be configured to determine a PDF 408 of the parameter based on the calculated values by the parameter blocks 404. The estimator 406 may be a separate operative unit or may be illustrative of a controller 118 executing specialized algorithms in memory 120 to determine the output of the estimator 406, such as, for example, algorithms found within Edward coding library or TensorFlow. The estimator 406 may output a PDF 408 of the parameter to be used by the controller 118 during, for example, recreation of a training route to account for the bias of the parameter if the parameter is a navigation parameter (e.g., w). The PDF 408 may comprise a mean value corresponding to the most probable estimate or expected value for the parameter. The estimator 406 may determine the variance of the PDF 408 based on differences between the values of the parameter calculated by each parameter calculation block 404, wherein the differences in the values may arise due to noise and/or biases. A controller 118 may expand on the system illustrated in FIG. 4A to further calculate additional PDFs for additional parameters as illustrated in FIG. 4B.

Figure 4B:
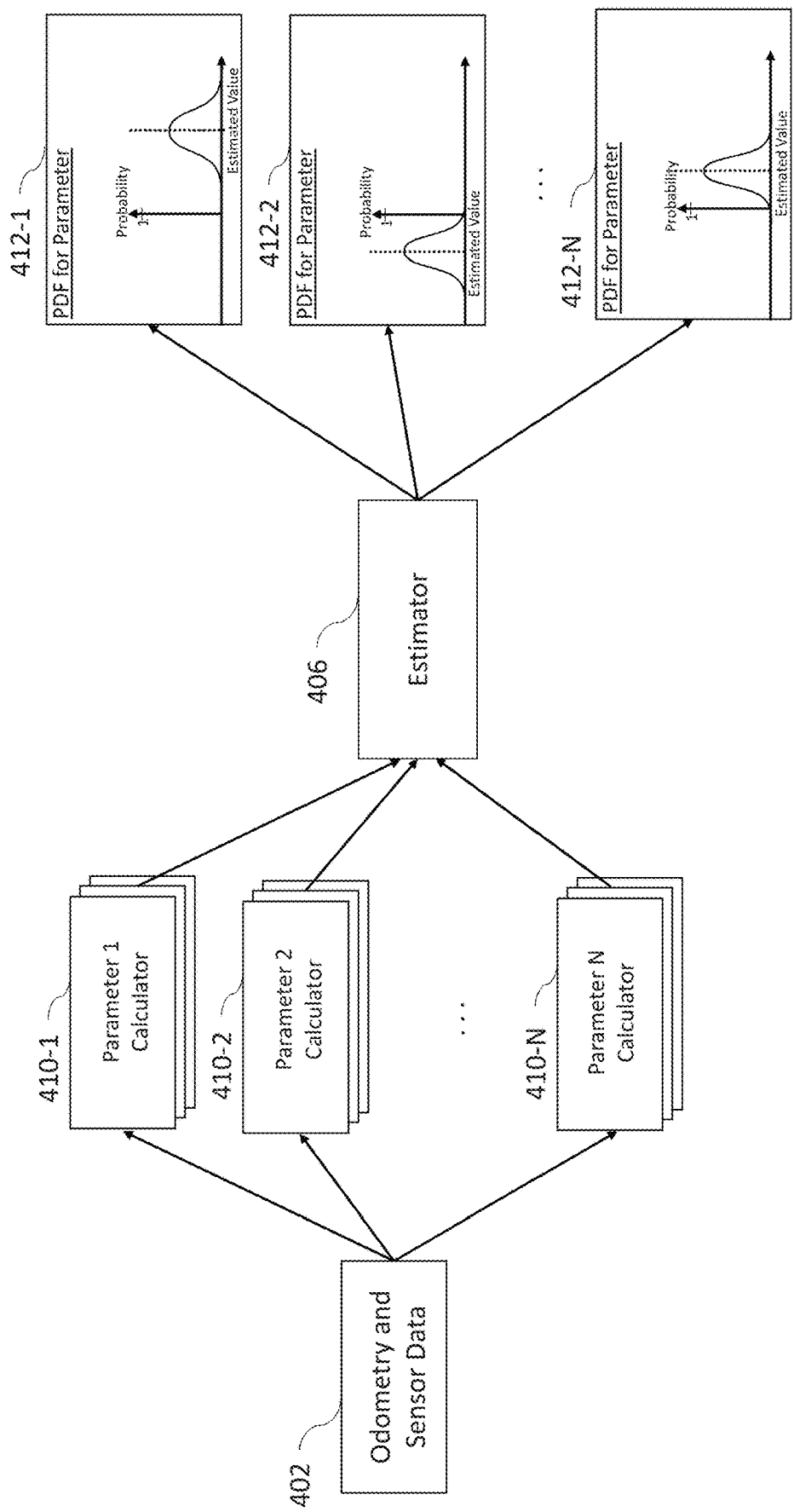
FIG. 4B is a functional block diagram of a system configured to determine a plurality of probabilistic bias distributions of a plurality of parameters useful for recreating a training route, according to an exemplary embodiment.

FIG. 4B illustrates a functional block diagram of a system configured to calculate a plurality of PDFs 412 for N of parameters of a robot 102, according to an exemplary embodiment. Index N may be a non-zero integer number corresponding to the number of parameters to be used during recreation of the training route. Similarly, index n may be used as an arbitrary non-zero integer number index to represent an arbitrary navigation parameter of the N navigation parameters calculated (i.e., n is less than N).

Parameter calculator blocks 410 may be configured to receive odometry and sensor data 402, previously illustrated in FIG. 4A, to calculate at least one value of a corresponding parameter (e.g., parameter 1 calculator block 410-1 calculates values of w, block 410-2 calculated values for acceleration, block 402-3 calculates values for mass of robot 102, etc.) based on odometry and sensor data 402. Each parameter calculator block 410 may further comprise two or more parameter calculation blocks 404 illustrated in FIG. 4A configured to calculate values (following random variables due to noise) of a respective parameter "n" based on data from two or more respective sensor units 114. The parameter calculator blocks 410 may be separate operative units or may be illustrative of a controller 118 executing specialized computer readable instructions stored in memory 120 to perform the operations of the parameter calculator blocks 410. The outputs of each parameter calculator block 410 may comprise a plurality of calculated values for each corresponding navigation parameter to be outputted to an estimator 406, wherein the outputted values may follow PDF comprising a variance due to noise of the sensor and odometry data 402. The plurality of outputted values by each parameter calculator block 410 may be denoted herein as a "set" of values (e.g., $[\omega_{gyro}, \omega_{steering}, \omega_{LiDAR}, \ldots ]$).

For example, each parameter "n" block 410-n may comprise k parameter calculation blocks 404 such that the parameter "n" block 410-n outputs k discrete values of the n'th parameter, k being an integer number greater than zero. The n'th parameter comprising an arbitrary measurable parameter of the robot 102 using odometry and sensor data 402. The k values of the n'th navigation parameter may be communicated to estimator 406 as a set. The parameter calculator blocks 410 may each output a set of values of their respective parameters as new odometry and sensor data 402 is acquired (e.g., one set per second, two sets per second, etc.). Accordingly, estimator 406 may receive a plurality of sets of calculated values for parameters of respective calculator blocks 410 over time (i.e., as robot 102 operates), such that a PDFs 412 may be generated for each of the N parameters.

The estimator 406 may output N PDFs 412 of each respective one of the N parameters, similarly illustrated for a single parameter in FIG. 4A above. In some instances, some or all of these PDFs 412 may enhance the ability of a controller 118 of a robot 102 to recreate a training route by accounting for a bias of a corresponding parameter. For example, a robot 102 recreating a training route may purposefully understeer during recreation of the route if the angular velocity navigation parameter is determined to be over biased based on the mean value of the angular velocity PDF 412, outputted by the estimator 406, being greater than zero (0). In some instances, the PDF 412 may represent a parameter of an internal characteristic of a robot 102, such as a time delay between measurements from two sensor units 114, as further discussed below. The same process of accounting for biases in navigation parameters may be repeated for any or all navigation parameters simultaneously for a robot 102 to recreate a training route.

According to at least one non-limiting exemplary embodiment, estimator 406 may collect and utilize all measurements from sensor units 114 collected during navigation of a route to determine a PDF 412 of a respective parameter of the robot 102. For example, estimator 406 may utilize measurements collected during complete navigation of an entire route from any or all sensor units 114 capable of measuring (directly or indirectly) a value of a parameter of the robot 102 and utilize all of these measurements to determine a PDF 412 for the parameter.

Advantageously, the distributed calculation system illustrated in FIG. 4A may provide an estimator 406 with a plurality of navigation parameter values calculated independently which may enhance the ability of the estimator 406 to determine a corresponding PDF 412 for the navigation parameter bias with high accuracy. Additionally, when expanded upon as illustrated in FIG. 4B, the simultaneous calculation of PDFs 412 for N navigation parameters may further enhance the ability of a controller 118 to recreate a training route, as the controller 118 may utilize the PDFs 412 of the N navigation parameters, or other parameters, account for a plurality of navigation biases during recreation of the training route. In other words, a robot 102 may recreate a training route perfectly if it is able to perfectly account for biases in all navigation parameters, wherein the distributed calculation system of FIG. 4A-B may enhance the ability of the robot 102 to account for all navigation parameter biases.

By way of an illustrative example, a parameter calculator block 410 may be configured to calculate k values for mass of a robot 102 using k equations, each of the k equations using, at least in part, odometry and sensor data 402, wherein estimator 406 may utilize the k values to determine a PDF 412 for the mass of the robot 102, k being any integer number greater than or equal to two. The PDF 412 may be normalized with respect to a default (i.e., manufactured) weight of robot 102 such that a mean value of the PDF 412 comprising a nonzero value corresponds to a nonzero deviation from the default mass (e.g., due to an attached object to the robot 102). The equations may be based on constants, such as size of robot 102 and its components, and measurable parameters, such as torque on wheels of robot 102, power consumption by actuator units 108, data from pressure sensors, etc., the measurable parameters being subject to noise and biases.

Figure 4C:
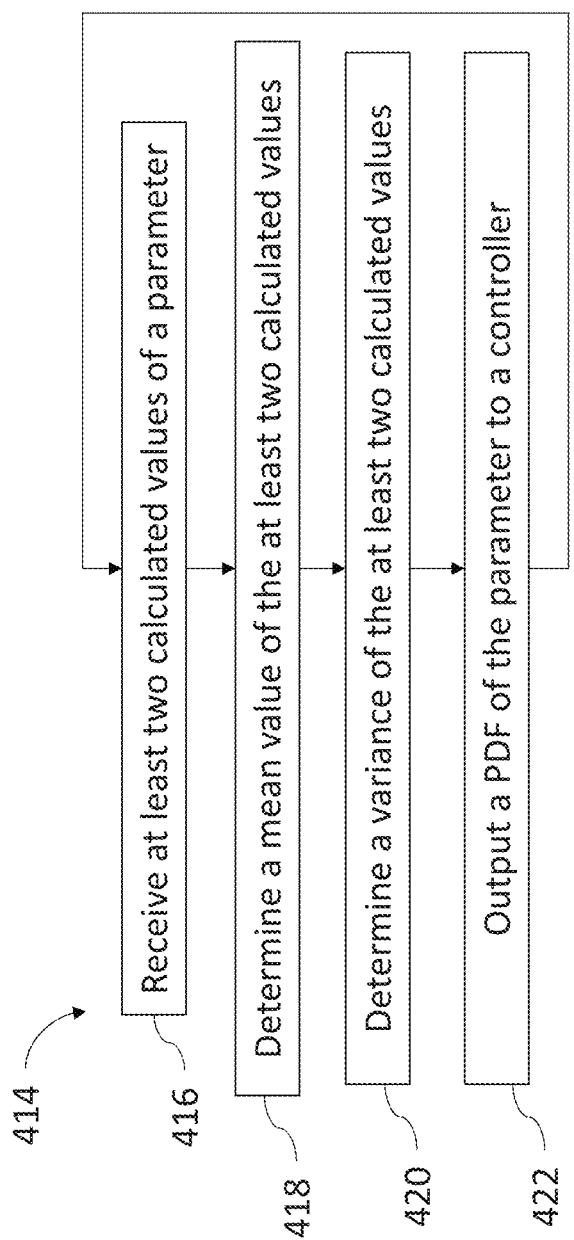
FIG. 4C is a process flow diagram of a method for an estimator to generate a bias distribution of a navigation parameter based on calculated values of the navigation parameter, according to an exemplary embodiment.

FIG. 4C illustrates a method 414 for an estimator 406, illustrated above in FIG. 4A-B, to determine a PDF 412 of parameter of a robot 102, according to an exemplary embodiment. It is appreciated that estimator 406 may be illustrative of computer readable instructions executed by a controller 118 of a robot 102 or separate processor 130 rather than a standalone operative unit. Method 414 illustrates a method for generating a single PDF 412 for a single parameter of a robot 102, wherein method 414 may be executed multiple times (e.g., in parallel) to calculate PDFs 412 for other parameters of the robot 102. Parameters of the robot 102, as used herein with respect to FIG. 4A-C, comprise any parameter relating to movement or navigation, physical features, or internal characteristics of the robot 102.

Block 416 illustrates the estimator 406 receiving at least two calculated values of a parameter from at least two respective navigation parameter calculation blocks 404. Each parameter calculation block 404 may utilize an equation, similar to equations 1 and 2 above, to calculate a value of the parameter using measurements from one or more sensor units 114. Some of the parameters of the equations utilized by the respective parameter calculation blocks 404 may comprise or be subject to noise and/or biases (e.g., the parameters "bias(t)" of equation 1, "$V_{steering}$" of equation 2, etc.). The at least two values of the parameter may be communicated as a set of values to the estimator 406. By way of illustrative example, the parameter may comprise translational velocity of a robot 102, wherein the set of values may comprise translational velocity measured by a LiDAR sensor (e.g., using ICP as discussed above); a gyroscope; an accelerometer; a first wheel encoder, a second wheel encoder, a third wheel encoder, etc. for first, second, third, etc. wheels of the robot 102; and so forth to produce a set of values $[v_{LiDAR}, v_{gyro}, v_{accelerometer}, v_{encoder1}, v_{encoder2}, v_{encoder3}, \ldots]$. Each value of the set may comprise different numeric values, as the respective sensor units 114 used to calculate the values are subject to noise and/or biases. Additionally, each value may calculate the translational velocity of the robot 102, at least in part, independently from other calculated values, which may be advantageous for calculating a true value of translational velocity executed or effectuated by the robot 102.

Block 418 illustrates the estimator 406 determining a mean value of the at least two calculated values received in block 416. The mean value may comprise an unweighted or weighted average of the values of the set calculated above. In some instances, a PDF 412 of the parameter may exist prior to receipt of the at least one calculated values of the parameter, wherein the estimator 406 may further be configured to utilize the prior PDF 412 to determine the mean value.

According to at least one non-limiting exemplary embodiment, the mean value may be normalized with respect to an ideal value of the parameter if the parameter is a navigation parameter, as navigation parameters may change in time as a robot 102 executes a route comprising turns and/or stops. For example, a robot 102 may translate with a linear velocity of $v_0$, wherein the estimator 406 may receive at least one measurement of the linear velocity from the at least one parameter calculation block 404 in step 416. The mean value calculated by the estimator 406 may comprise an average deviation of the at least one measurements from the $v_0$ value. Accordingly, the mean value produced in this step 418 may correspond to a mean value of deviation from an ideal value (i.e., a mean value of a bias). Advantageously, determining the mean value as a mean deviation from an ideal value of a navigation parameter, or any parameter of robot 102 (as discussed below), may account for the parameters changing in time, such as, for example, robot 102 executing different motions along a route (e.g., stopping, during left and right, etc.).

By way of illustrative example, a robot 102 may comprise an actuator unit 108 configured to, upon receiving an input from controller 118, translate the robot 102 at a rate of 1 meter per second. The actuator unit 108 may, however, be under biased, causing the robot 102 to translate 0.2 meters per second slower than specified by the controller 118. Accordingly, estimator 406 determining a mean value based on deviation (e.g., the 0.2 meters per second) from an ideal value (e.g., the 1 meter per second) may yield a mean value of 0.2 meters per second of under bias. Had the estimator 406 simply averaged translational speed as the robot 102 executes a route comprising stops and/or turns, the mean value may not accurately represent the deviation from the ideal value (i.e., the bias or error).

Block 420 illustrates the estimator 406 determining a variance of the at least two calculated values received in block 416. The variance may be based on a difference of each calculated value with respect to each other. The variance may be proportional to a deviation of the received at least one calculated values from the mean value calculated in block 418. For example, if the received at least one calculated values are substantially different from each other, the determined variance by estimator 406 may be large. Conversely, if the calculated values are substantially similar to each other (e.g., for a robot 102 comprising well-calibrated, low noise, and unbiased sensor units 114), the determined variance may be small.

Block 422 illustrates the estimator 406 outputting the PDF 412 of the bias of the navigation parameter, comprising a mean value calculated in block 418 and a variance calculated in block 420, to a controller 118 of a robot 102. It is noted that estimator 406 utilizes discrete measurements or calculations to determine the PDF 412, hence the PDF is a probability distribution function. In some embodiments, the at least one values received in block 416 may be continuously input to estimator 406 over time, wherein the PDF 412 may comprise a probability density function. This PDF 412 of the bias of the navigation parameter may enhance the ability of the controller 118 to account for the determined bias during future navigation of a route. In addition, if the variance of the outputted bias distribution meets or exceeds a variance threshold, as illustrated below in FIG. 6, the controller 118 may determine sensor units 114 of the robot 102 require further calibration.

In some instances, the PDF 412 for the parameter may be calculated using a set of calculated values for the parameter calculated at prior times. That is, a PDF 412 for the parameter may exist as a prior. Accordingly, the PDF 412 outputted in step 422 may be further utilized by the estimator 406 to update the preexisting PDF 412 of the parameter based on new measurements collected by sensor units 114, which, in turn, yield new sets of calculated values of the parameter.

Figure 11:
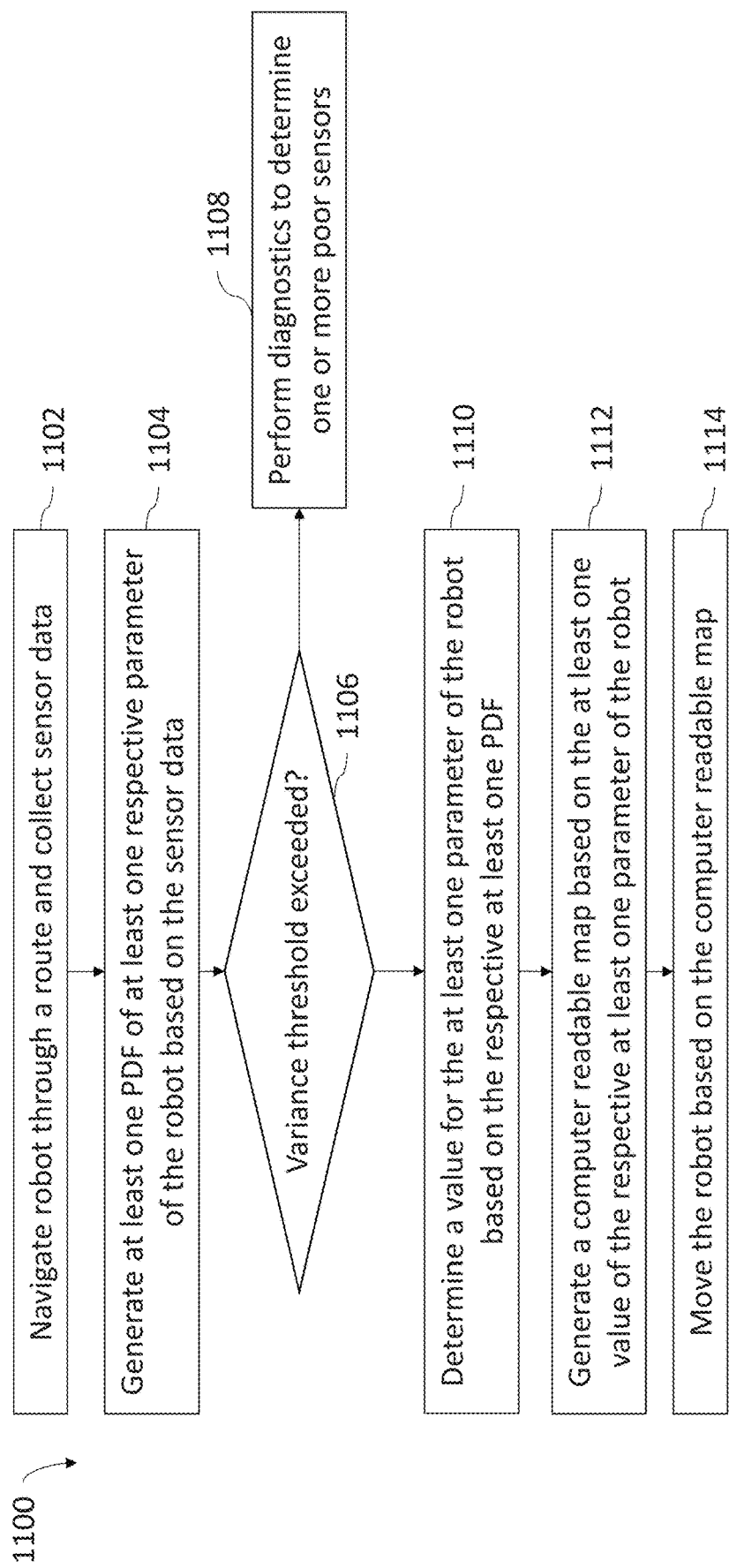
FIG. 11 is a process flow diagram illustrating a method for a robot to navigate or recreate a route using the systems and methods disclosed herein, according to an exemplary embodiment.

According to at least one non-limiting exemplary embodiment, method 414 may be performed during every initialization of a robot 102 (i.e., every time the robot 102 is powered on/off) or after navigation of a route, wherein estimator 406 may utilize all data collected by sensor units 114 during navigation of the route to determine the PDF 412. For example, controller 118 may collect measurements of translational velocity throughout the route, wherein the PDF 412 produced in step 422 may be based measurements collected during navigation of the entire route from two or more sensor units 114. That is, repetition of method 414 upon the controller 118 outputting the PDF 412 is not intended to be limiting, as illustrated in FIG. 11 below.

According to at least one non-limiting exemplary embodiment, the at least two calculated values may be illustrative of measurements of a parameter using data from at least two separate sensor units 114, wherein a plurality of measurements of the parameter may be sampled by the estimator 406 to determine the PDF 412. That is, in some embodiments, estimator 406 may utilize all measurements of a parameter during navigation of an entire route and determine the PDF 412 based on all of the measurements once navigation of the route is complete, rather than incrementally updating the PDF 412 based on new measurements, wherein the measurements utilize data from at least two separate sensor units 114. This embodiment is further illustrated below in FIG. 11.

Figure 5:
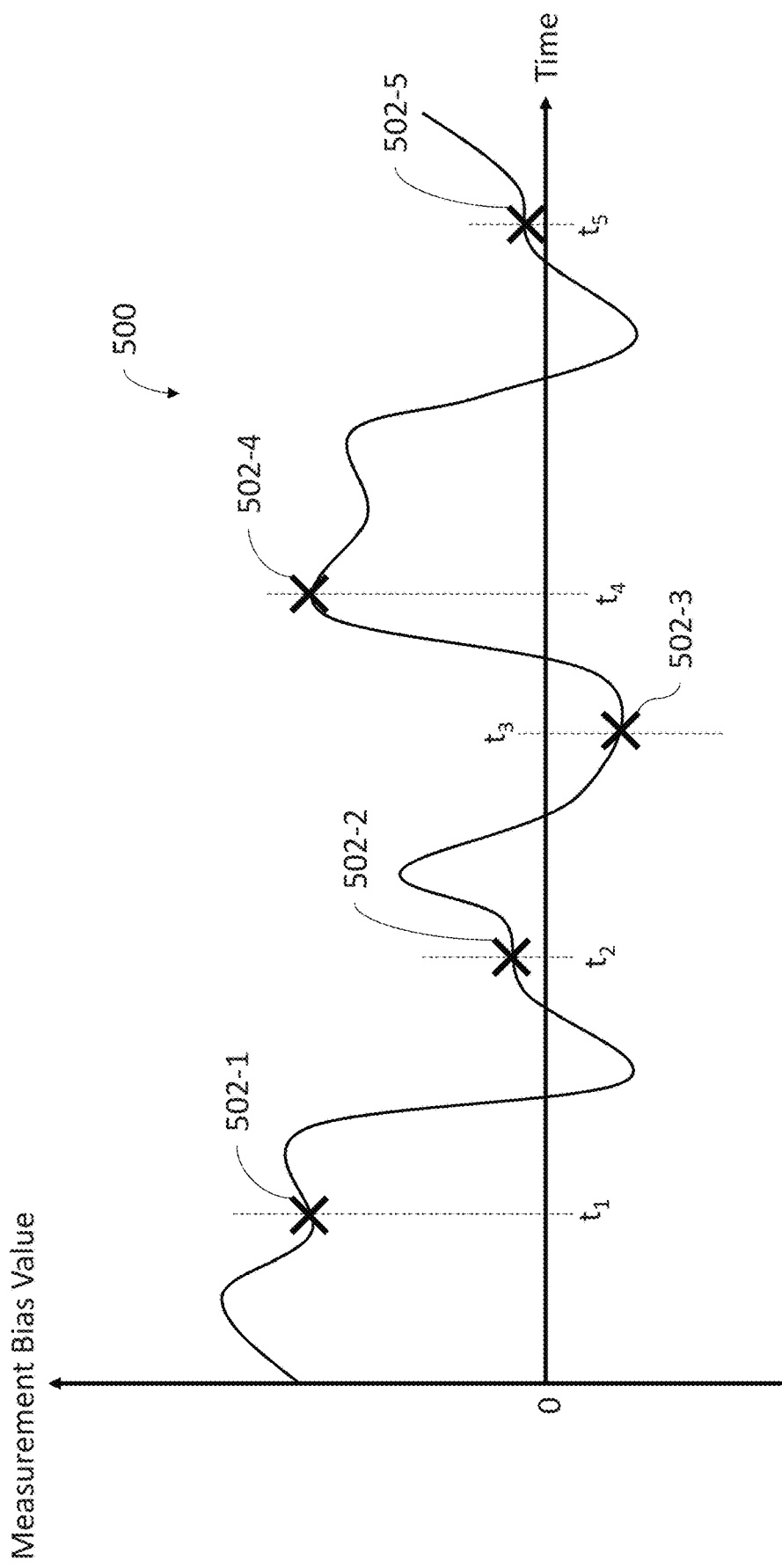
FIG. 5 illustrates a method for calculating a bias in a sensor and/or odometry unit used for determining a bias in a parameter useful for recreating a training route, according to an exemplary embodiment.

FIG. 5 illustrates a method for calculating a measurement bias value for some odometry units according to an exemplary embodiment. A measurement bias of some odometry units, such as accelerometers and gyroscopes, may be calculated directly at particular instances in time, such as, for example, when a robot 102 comprising the odometry units is not moving. If an accelerometer of an idle robot 102 measures a nonzero value, the nonzero value may be the bias of the accelerometer. Similarly, a measurement bias of a gyroscope may be measured while a robot 102 is idle on a flat surface (e.g., a flat floor) if the gyroscope measures a nonzero tilt (with respect to the flat surface or along a pitch, roll, or yaw axis).

The graph 500 illustrates an exemplary measurement bias value of an odometry unit, such as a gyroscope, changing over time. The graph 500 may be illustrative of a Gaussian process or random process. A measurement bias value of an odometry unit may change in time due to, for example, fluctuations in temperature of a surrounding environment. A robot 102 navigating a route may perform a plurality of stops 502-n on flat surfaces, indicated by a cross on the graph 500, at corresponding times $t_n$, wherein index n may correspond to an arbitrary integer number greater than zero. During these stops, the robot 102 may measure a measurement bias value of the odometry unit to be used during calculation of one or more navigation parameter bias values (following a PDF due to noise of the odometry unit) for one or more corresponding navigation parameters using the method illustrated in FIG. 3 above (e.g., block 306). The vertical axis of measurement bias values may correspond to biases within the measurements of the odometry unit, such as, for example, roll measurements, pitch measurements, or yaw measurements of a gyroscope, wherein the values may fluctuate from being over biased (e.g., a measurement bias value greater than zero) to under biased (e.g., a measurement bias value less than zero) due to external factors (e.g., temperature fluctuations).

Measurement biases in other units, such as distance measuring sensors, may be performed using other methods appreciated by one of ordinary skill in the art. For example, a robot 102 may utilize a distance measuring LiDAR sensor and a nearby object mapped onto a reference map, wherein the robot 102 is localized on the reference map, to determine a measurement bias of the LiDAR sensor. The measurement bias may be determined based on a difference in the distance observed by the LiDAR sensor and the distance expected based on the reference map. The biases of sensors may also be determined during calibration of the sensor either by an operator or manufacture of the robot and/or sensors. These measurable biases of the sensors and/or odometry units may be used to calculate values of navigation parameters, as illustrated by blocks 404 of FIG. 4A, used to recreate or navigate a route based on the odometry and/or sensor measurements, wherein the calculated values of the navigation parameters may follow a PDF due to noise of the measurements by the sensors and/or odometry units which measure the navigation parameters. The values of the navigation parameters may further be used to determine PDFs 412 of biases of the navigation parameters used to recreate the route (e.g., velocity biases causing a robot to move too fast or slow).

Advantageously, directly measuring a measurement bias of a sensor or odometry unit may reduce the variance of a probabilistic distribution of navigation parameter biases determined by an estimator 406 as the measurement bias of the sensor or odometry unit may be subtracted or added to a recorded measurement by the biased sensor or odometry unit based on a reference. The reference for the gyroscope or accelerometer measurements comprise the flat floor (i.e., zero tilt reference) and the idle robot (i.e., zero acceleration). The reference for the distance measuring sensor comprising the reference object or reference computer readable map of an environment. Accordingly, this may drastically reduce the variance of the values of the navigation parameters calculated (e.g., in block 306 of FIG. 3, by navigation parameter calculation blocks 404 of FIG. 4A, and/or by navigation parameter n calculator block 410 of FIG. 4B), which may therefore reduce the variance of a navigation parameter bias PDF 412 determined by the estimator 406.

Figure 6:
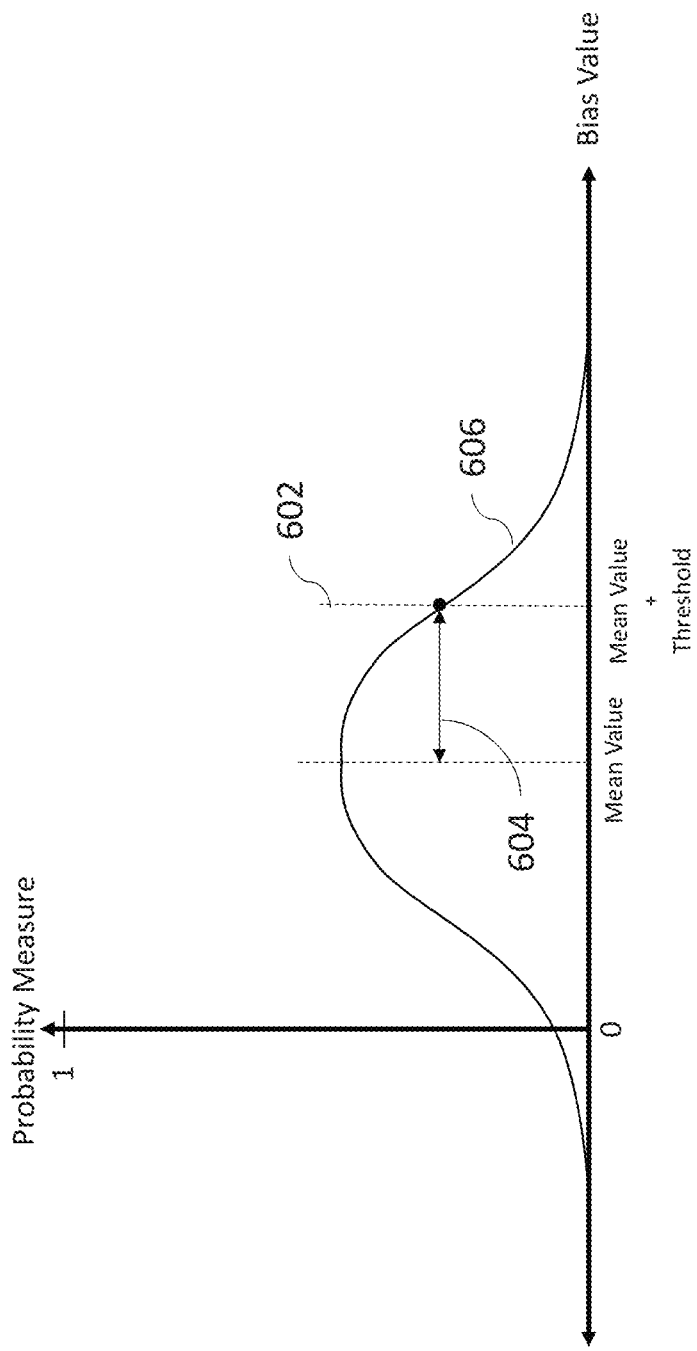
FIG. 6 illustrates a variance threshold for a navigation parameter bias distribution, according to an exemplary embodiment.

FIG. 6 illustrates a threshold 602 for a variance measurement 604 of a PDF 606 of a parameter bias distribution determined by an estimator 406, according to an exemplary embodiment. Threshold 602 may be communicated to a robot 102 via communications units 116 (e.g., from an external server), user interface units 112, or determined by a controller 118. Threshold 602 may be a variance threshold for a PDF 412 of a bias distribution for navigation parameter, wherein a PDF 412 of the bias distribution for the navigation parameter comprising a variance measure 604 meeting or exceeding threshold 602 may be determined (by an operator or controller 118) to be unsafe and/or too inaccurate to recreate a route due to the large variance. A large variance in a navigation parameter PDF 606 may lead to a large uncertainty of the value of the bias of the navigation parameter and may therefore be difficult for a controller 118 to account for the value of the bias of the navigation bias due to the large uncertainty of the precise value of the bias. The variance measure 604 may be taken from the mean value of the navigation parameter bias distribution to any point along the distribution, such as, for example, as illustrated, the point where the probability measure is half of the maximum value (e.g., half of the probability measure at the mean value).

By way of illustrative example, a parameter calculator block 410, illustrated in FIG. 4B above, may output a set of values for translational velocity of a robot 102. The set may comprise $[v_{LiDAR}, v_{gyro}, v_{accelerometer}, v_{encoder1}, v_{encoder2}, v_{encoder3}, \ldots]$, $v$ corresponding to a calculated velocity based on measurements from respective sensor units 114 denoted by a corresponding subscript. If, for example, only encoder 2 is very noisy and comprises a large bias, $v_{encoder2}$ may be substantially different from the remaining values of the set, thereby causing variance of the set to be large due to the single outlier $v_{encoder2}$. Accordingly, the variance threshold 602 may be utilized to detect that one of the sensor units 114 used to calculate the set comprises a substantial noise and/or bias. In this case, the controller 118 may halt any current task and perform internal diagnostics (e.g., execute computer readable instructions) to identify the noisy and biased encoder 2 due to its measurements causing the PDF 412 to exceed the variance threshold 602. In some embodiments, the robot 102 may call for human assistance upon threshold 602 being met or exceeded. Identification of a noisy sensor unit 114 may further enhance autonomy of a robot 102 by enabling the robot 102 to determine any sensor units 114 from which measurements should not be relied upon to navigate the robot 102.

Advantageously, prescribing a variance threshold 602 may enhance the ability of a controller 118 of a robot 102, as well as human operators of the robot 102, to determine if one or more sensors and/or odometry units require calibration from a human operator. Accordingly, this may further enhance the ability of the robot 102 to operate safely and navigate or recreate a route more accurately as the robot 102 may determine if the sensors and odometry units of the robot 102 are well calibrated (e.g., below the variance threshold 602) without the need of a human operator.

One skilled in the art would appreciate that a variance threshold may be imposed for any calculated parameter of a robot 102. For example, a variance threshold may be imposed for energy consumption of a motor of a robot 102, wherein a motor comprising a high variance for energy consumption may be unpredictable, consume too much or too little energy, unreliable, and/or be unsafe. That is, threshold 602 is not intended to be limiting to PDFs 412 of a bias of a parameter.

Figure 7:
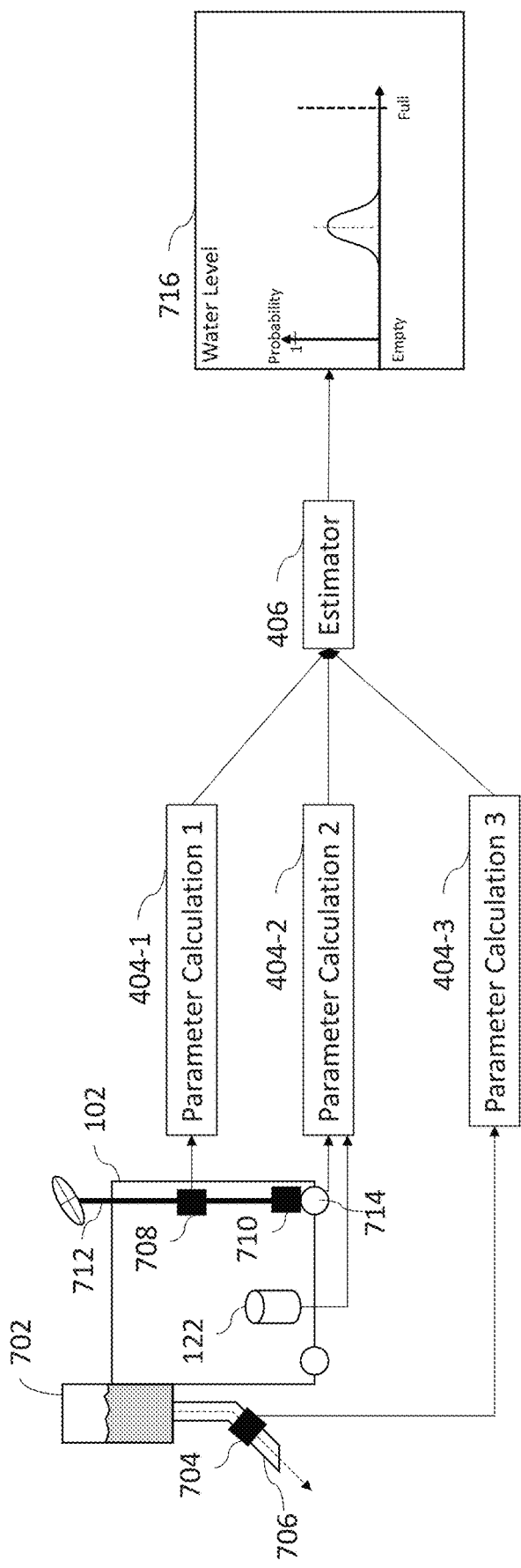
FIG. 7 illustrates an implementation of the systems illustrated in FIG. 4A-B to calculate a water level within a water tank of a robot, according to an exemplary embodiment.

FIG. 7 illustrates a robot 102 utilizing the systems and methods of the present disclosure to estimate water level within a water tank 702, according to an exemplary embodiment. Robot 102 may comprise a cleaning robot configured to utilize the water tank 702 to wet a floor. Robot 102 may comprise a plurality of sensor units 114, including, without limitation, a nozzle and/or flow control sensor 704, a steering shaft encoder 708, and an ammeter 710 coupled to an actuator configured to turn a wheel 714 of the robot 102. Controller 118 of the robot 102 may utilize measurements from these sensors 704, 708, and 710 to estimate the water level within the tank 702.

As a first example, parameter calculation block 404-1 may utilize a predetermined first equation to estimate the water level within tank 702 based on a measured torque or turning force (i.e., power required to turn) required to turn the steering shaft 712. The turning force being proportional to friction between the front wheel 714 of the robot 102 and the ground, which is in turn proportional to a weight of the robot 102. Memory 120 may comprise a stored value equal to a weight of the robot 102 when no water is stored within the tank 702. Accordingly, the first equation utilized by parameter calculation block 404-1 to calculate the water level within tank 702 using an equation proportional to: weight of the robot 102 when the tank 702 is empty, turning force required to turn the front wheel 714 when tank 702 is empty, and turning force required to turn the front wheel 714 with the tank 702 comprising an unknown water level therein (i.e., current measurements from the encoder measuring the turning force or torque).

As a second example, parameter calculation block 404-2 may utilize current draw from an actuator unit 108 configured to rotate the front wheel 714 to estimate a current weight of the robot 102, which, when the default weight of the robot 102 with an empty tank 702 is subtracted from the current weight, may yield the current water level within tank 702. That is, current drawn by the actuator unit 108 configured to rotate wheel 714 may be proportional to weight of the robot 102. Weight of the robot 102 may be further utilized, along with weight of the robot with an empty tank 702, to determine the weight of the water tank 702, and therefore the water level within the water tank 702.

As a third example, parameter calculation block 404-3 may utilize data from a flow control sensor 704 to estimate water level within the tank 702 based on an amount of water which has flown through the nozzle 706. The equation executed by block 404 may be proportional to: flow rate (i.e., volume of water per second) through nozzle 706, and/or how long the water is allowed to flow through nozzle 706.

These three calculated values may be input to the estimator 406, wherein the estimator 406 may utilize these values to output a PDF 702 comprising a PDF of the water level within the tank 702. The values calculated may be continuously input to the estimator 406 from the three parameter calculation blocks 404-1, 404-2, and 404-3 such that additional measurements of the water level over time may be collected to enhance accuracy of the determined PDF 702. In some embodiments, estimator 406 may sample values discretely from the parameter calculation block 404-1, 404-2, and 404-3, wherein the PDF 702 may comprise a probability distribution function rather than a density function as illustrated. One skilled in the art may appreciate the method illustrated for measuring water level within tank 702 may be substantially similar to measuring a weight of an object being carried by or attached to the robot 102.

Figure 8:
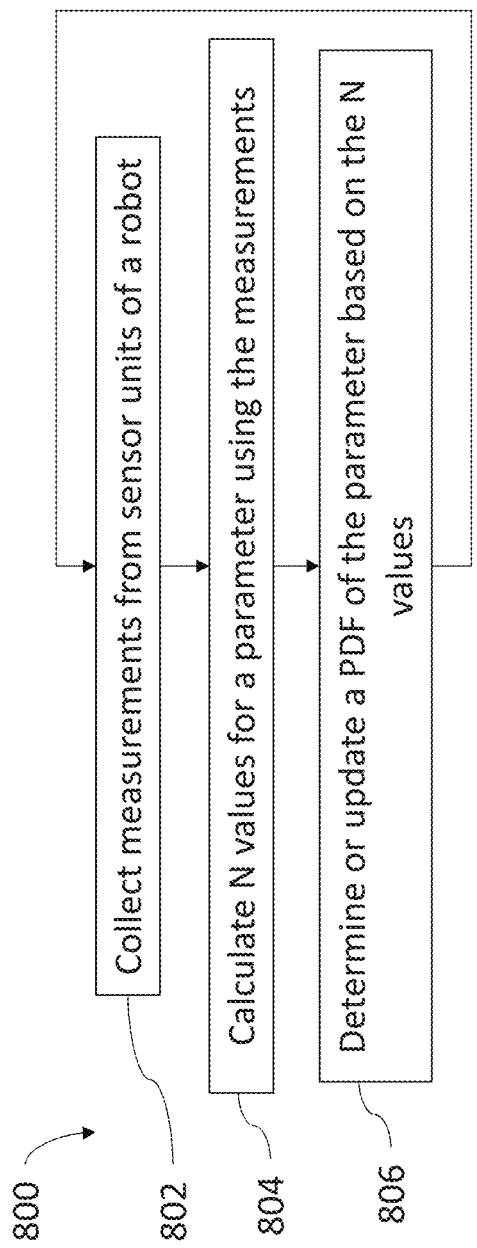
FIG. 8 is a process flow diagram illustrating a method for a controller or processor to determine and update a PDF of a parameter, according to an exemplary embodiment.

FIG. 8 illustrates a method 800 for a controller 118 of a robot 102 to calculate and update a PDF of a parameter of a robot 102, according to an exemplary embodiment. A parameter of the robot 102 may comprise any measurable parameter using data from one or more sensor units 114, including, without limitation, mass, wheel placement, navigation parameters (e.g., acceleration, rotational velocity, etc.), biases of sensor units 114, and the like. Any steps performed by controller 118 of method 800 may comprise the controller 118 executing computer readable instructions from memory 120 illustrated in FIG. 1A above.

Block 802 illustrates the controller 118 collecting measurements from sensor units 114 of a robot 102. The measurements may comprise any or all measurements or data from depth cameras, RGB cameras, encoders, gyroscopes, accelerometers, magnetometers, and/or any other sensor unit of sensor units 114 discussed in FIG. 1A above. These measurements may be subject to noise and/or biases.

Block 804 illustrates the controller 118 calculating N values for a parameter of the robot 102 using the measurements acquired in block 802 above. N may comprise an integer value greater than or equal to one (1); however, one skilled in the art may appreciate that larger values of N may yield more accurate estimation of the parameter. Each of the N values of the parameter may be calculated using predetermined equations, e.g., equations 1 and 2 above, the predetermined equations being at least in part proportional to the measurements from the sensor units of the robot 102.

Block 806 illustrates the controller 118 determining or updating a PDF of the parameter based on the N values of the parameter. That is, controller 118 may execute method 414 of FIG. 4C above to determine or update a PDF of the parameter. Stated differently, the controller 118 may utilize the values of the parameter calculated in block 804 as additional data points, in addition to values of the parameter calculated in the past (if available), to determine the PDF of the parameter. Upon updating or determining the PDF of the parameter, the controller 118 may return to block 802 and repeat method 800. Advantageously, repeating method 800 numerous times may yield a large set of data points that measure a value of the parameter, the large set of data points may be represented as a PDF, wherein use of a substantial number of data points yields a more accurate PDF of the parameter.

Some embodiments of the systems and methods of the present disclosure may be utilized to determine time delays between components of a robot 102. For example, a robot 102 may execute a turn and capture at least two point cloud scans using a depth camera or LiDAR sensor of sensor units 114. Using scan matching algorithms such as ICP or pyramid scan matching, a distance transformation between two scans may be determined. The distance transformation may correspond to motion executed by the robot 102 (i.e., the distance transform tracks relative motion of objects sensed by the LiDAR or depth camera). That is, point clouds may be utilized as a standalone laser odometry (SLO) to measure motion of a robot 102. Standalone laser odometry may also be known as LiDAR odometry and mapping (LOAM) within the art.

As a robot 102 executes a turn, a gyroscope may tilt, wherein the tilt is measured and correlated to a turning angle and/or turning rate of the robot 102. Gyroscopes, however, may comprise a time delay between when the robot 102 begins the turn and when the gyroscope is tilted and indicating the turn is being executed. SLO, however, is not dependent on physical movement of any mechanical part and may therefore indicate the robot 102 is turning prior to a gyroscope indicating the robot 102 is turning. In some embodiments, the delay between SLO and gyroscope indicating a movement of the robot 102 may further be caused by trace delay in printed circuit board traces, noise, differing sampling intervals, and/or register to register transfer times between the processor and sensors. Accordingly, using the systems and methods of the present disclosure, the time delay between SLO indicating the robot 102 is turning and the gyroscope indicating the robot 102 is turning may be determined.

Following methods 300, 412, and 800 above, a robot 102 may be navigated through a route and collect a plurality of point cloud scans and gyroscope measurements, among other measurements from sensor units 114, the route comprising at least one turn. The point cloud scans collected at the at least one turn may be utilized by one or more parameter calculator blocks 410 to determine motion of the robot 102 (e.g., determine linear velocity, angular velocity, or other state space parameters). Similarly, gyroscope measurements may model the motion of the robot 102 over time as well. An estimator 406 may be utilized to determine a PDF 412 comprising a distribution of time delays between the movements of the robot 102 as determined by the SLO and the gyroscope. This PDF 412 may comprise a mean value corresponding to a best estimate for the time delay between the SLO and the gyroscope measuring a turn of the robot 102. Typically, the time delay may range from [−0.1, 0.1] seconds, which may be significant for a robot 102 operating with CPU clocks at kilohertz or greater frequencies; however, this is not intended to be limiting. Advantageously, synchronizing motion of the robot 102 as measured by the SLO and gyroscope may further enhance navigation, localization, and mapping capabilities of a robot 102, as the robot 102 may track its motion and position with enhanced precision using additional sensor units 114 and is not reliant on a single sensor unit 114 (e.g., SLO or gyroscope) to determine its motion by ensuring measurements of the motion from both sensors agree with each other. By ensuring measurements of movement of the robot as measured by both the SLO and the gyroscope agree, the actual or effectuated movements (i.e., as measured by an external observer) of the robot may be measured or estimated with enhanced accurately.

Figure 9:
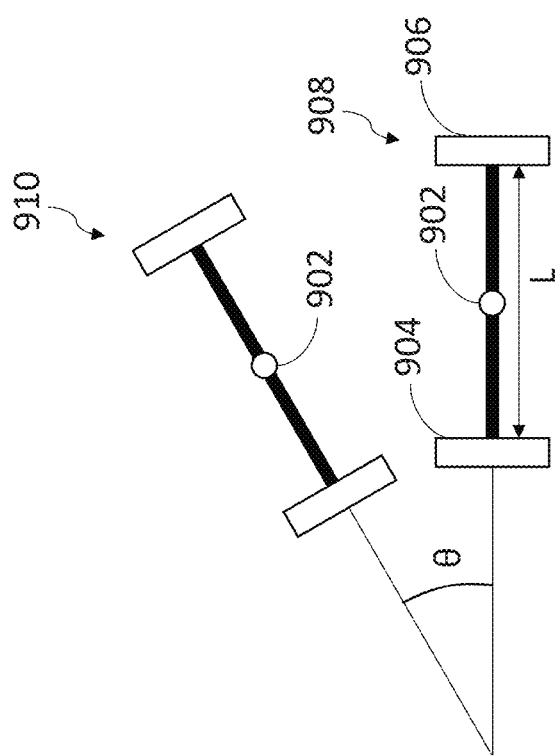
FIG. 9 illustrates a differential drive robot and a method for determining wheel separation using a kinematic model, according to an exemplary embodiment.

Some embodiments of the systems and methods of the present disclosure may be utilized to determine a physical parameter of a robot 102 based on a kinematic model of the robot 102. For example, the physical parameter may comprise wheel separation or distance between wheels. A kinematic model of a robot 102 may represent motions of the robot 102 in response to control signals to actuator units 108 configured to move the robot 102. Kinematic models of a robot 102 may be based on wheel and/or drive configuration (e.g., differential drive, tricycle configuration, four wheel configuration, etc.), physical constants, such as separation between wheels, and measurable parameters, such as a kinematic response of the robot 102 given a steering angle or drive/actuator command. By way of an illustrative example, FIG. 9 illustrates a differential drive of a robot 102, according to an exemplary embodiment. The state space equations for the kinematic model of a differential drive robot 102 are as follows:

$$dx = \frac{1}{2}(dl + dr)\text{sinc}\left(\frac{d\theta}{2\pi}\right)\cos\left(\frac{d\theta}{2}\right) \quad \text{Eqn. 3}$$

$$dy = \frac{1}{2}(dl + dr)\text{sinc}\left(\frac{d\theta}{2\pi}\right)\sin\left(\frac{d\theta}{2}\right) \quad \text{Eqn. 4}$$

$$d\theta = (dl + dr)/L \quad \text{Eqn. 5}$$

Wherein, dx and dy represent positional displacement of the origin 902 with respect to a Cartesian plane and dθ represents angular displacement of the origin 902 measured in radians about a turn center as illustrated. Parameters dl and dr represent distance traveled or displacement of the left wheel 904 and right wheel 906, respectively. Parameter L represents the distance between the wheels 904 and 906. It is appreciated that the above equations may comprise time dependent parameters (e.g., L may change in time due to wear and tear), however the above relationships or equations are constant in time for the differential drive robot.

Using the kinematic model illustrated by equations 3-5 above, a controller 118 of a robot 102 may determine the parameter L by emitting control signals to rotate wheels 904 and 906. For example, the controller 118 may emit a control signal to actuator units 108 to rotate left wheel 904 at 1 Hz and the right wheel 906 at 2 Hz in the same direction to configure the differential drive to rotate or turn the robot 102 as illustrated from a first position 908 to a second position 910. One or more encoders and/or SLO may be utilized to ensure the rotation rate of the two wheels are effectuated as specified by the controller 118 (e.g., using the systems and methods above in FIG. 4A to determine biases and accounting for the biases in the encoders, actuators, sensor units, etc.). Controller 118 may collect additional measurements from sensor units 114 to determine dx, dy, or distance traveled by origin 902, in response to the emitted control signals, from the first location 908 to the second location 910. For example, the controller may utilize data from LiDAR sensors to perform SLO, data from wheel encoders (if size of wheels 904 and 906 are known or measured using a method discussed below), data from gyroscopes, data from accelerometers, etc. to determine values for dx and dy which represent movement of the robot origin 902. Upon the controller 118 utilizing the systems illustrated in FIG. 4A-B to determine its displacement in response to movement of the left wheel 904 and right wheel 906 (i.e., measuring actual distance traveled using PDFs 412 of the dr, dl, dx, dy, dθ parameters), the controller 118 may utilize the kinematic model above to solve for L.

During navigation of a route, the controller 118 may determine control signals to effectuate rotation of the wheels 904 and 906 based on the above kinematic model to move the robot 102, wherein the value for L is required for the controller 118 to accurately predict a kinematic response to the control signals. L may be predetermined by a manufacturer of the robot 102; however, L may change over time due to, for example, wear and tear, collisions, bumps in a floor, and/or for any other reason. Changes in L not accounted for by controller 118 may cause a robot 102 to navigate poorly, turn improperly, map objects and routes inaccurately, localize itself inaccurately, and/or pose a safety risk to nearby humans. It is appreciated that the determined value for L follows a PDF due to the sensor units (e.g., encoders, LiDARs, etc.) used to determine L from the kinematic model being subject to noise and biases.

It is appreciated that use of a kinematic model to describe positional displacement of a robot 102 (i.e., of an origin 902)

in response to control signals emitted by controller 118 to measure wheel separation is not intended to be limiting but rather illustrative of a use of the broader systems and methods of this disclosure for a particular application. That is, controller 118 may emit a control signal to an actuator unit 108 to move a robot 102 by a desired value; verify, using the system illustrated in FIG. 4A, any discrepancy between the desired value and actual value of movement of the robot 102; and further utilize the actual value and a predetermined model to measure parameters of the robot 102. It is additionally appreciated that kinematic models for other wheel or drive configurations of a robot 102 are known within the art (e.g., for tricycle, four wheel robots, etc.), wherein the same systems and methods may be applied to any kinematic model for any robot 102.

As an additional exemplary implementation of the systems and methods of the present disclosure, SLO may be utilized to measure radius of wheels 904 and 906. As discussed above, SLO may be utilized to measure movement of a robot 102 using LiDAR or depth camera point clouds based on measuring relative motion of nearby objects as the robot 102 moves using ICP or pyramid scan matching algorithms. A controller 118 may emit a control signal to an actuator unit 108 to move the robot 102 forwards, wherein SLO may measure the forward motion or distance traveled of the robot 102 in response to the control signals using two or more point clouds. Wheel encoders may count a number of revolutions the wheels 904 and 906 make in response to moving the distance measured by SLO. Accordingly, the wheel circumference, and thereby the radius, may be determined by dividing the distance traveled as measured by the SLO (e.g., a value calculated by a parameter calculation block 404) by the number of revolutions counted by the wheel encoders. In some instances, additional parameter calculation blocks 404 may utilize measurements from other sensor units 114 (e.g., gyroscope, accelerometer, etc.) to verify the distance traveled measured by the SLO, as illustrated in FIG. 4A above, wherein measurements from the other sensor units 114 may be further utilized by the system illustrated in FIG. 4A to ensure biases of the other sensor units 114 are accounted for. That is, any parameter of a robot 102 following a predetermined model may be determined with substantial accuracy using the systems and methods described herein, as measurements from sensor units 114 may be verified and biases accounted for such that accurate measurements of the parameters using the models is achievable and are not reliant on a single measurement from a single sensor unit 114.

Figure 10:
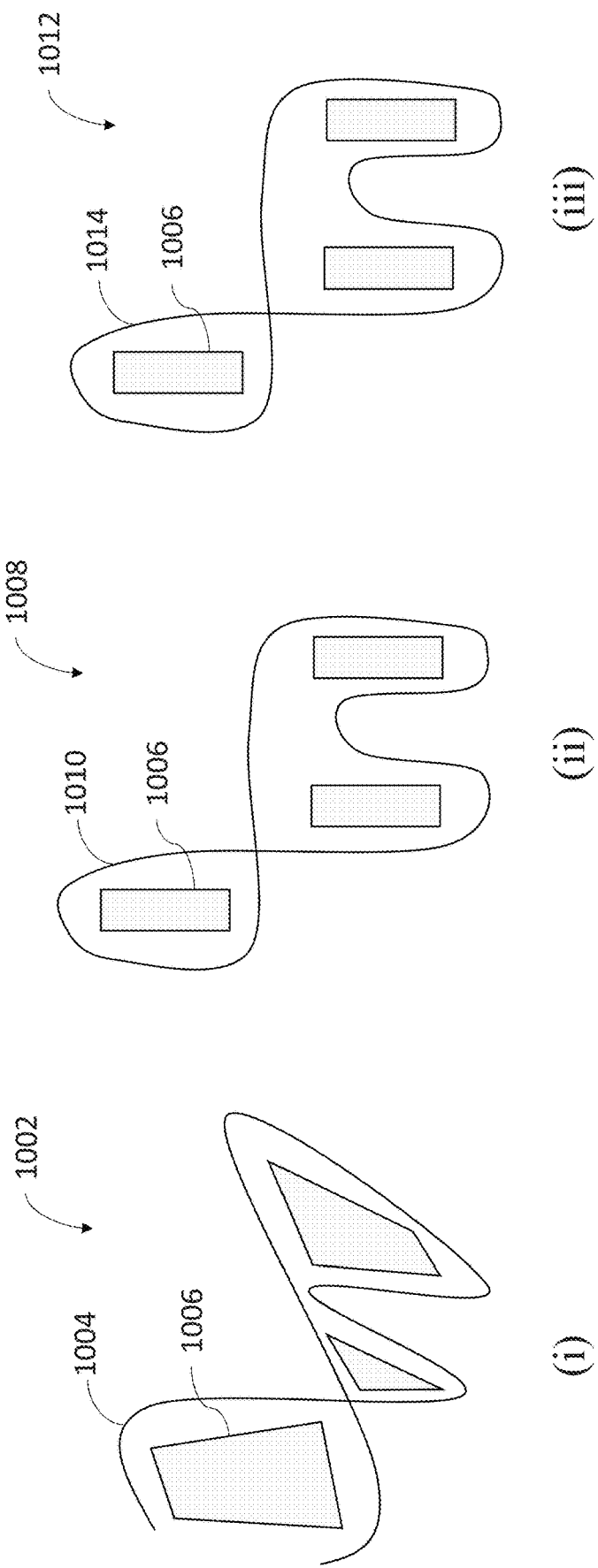
FIG. 10 (i-ii) illustrates a first map, generated without accounting for biases of navigation parameters, and a second map, generated by accounting for calculated biases of navigation parameters using the systems and methods disclosed herein, according to an exemplary embodiment.

FIG. 10 (i-iii) illustrates another practical implementation of the systems and methods of the present disclosure to correct a map 1002 of an environment, the map 1002 comprising a trained route 1004 therein mapped using raw odometry data, according to an exemplary embodiment. First, in FIG. 10(i), route 1004 may be navigated by a robot 102 in a training mode, wherein the robot 102 is driven, pushed, pulled, or otherwise directed through the route 1004 by an operator. Controller 118 of robot 102 may collect measurements from sensor units 114 to generate the map 1002 by localizing objects and determining motions executed by the robot 102 based on the data from sensor units 114. The sensor units 114, however, may comprise noise and biases, thereby causing the map 1002 to incorrectly or poorly represent the environment, as illustrated in FIG. 10(iii) comprising a reference map 1012 or ground truth localization and route 1014 data for visual reference. That is, route 1014 is the route navigated by the robot 102 under user guidance as observed by an external observer, and route 1004 is the route as measured by the biased sensor units 114 of the robot 102 as perceived by the controller 118 of the robot 102 using raw odometry data. Additionally, objects 1006 of map 1002 are distorted with respect to their actual rectangular shape as illustrated in map 1012. Accordingly, the robot 102 may utilize the systems and methods disclosed above to correct the map 1002.

As illustrated in FIG. 10(ii) biases of sensor units 114 are accounted for in map 1008. For example, using the system illustrated in FIG. 4A, controller 118 of the robot 102 may determine its angular velocity $\omega(l)$ is over biased (i.e., $\omega(l)$ is measured smaller than an actuated or actual value), thereby causing the distortion in the shape of objects 1006 and turns of route 1004 of FIG. 10(i). Parameter l represents distance along the route 1002, wherein angular velocity may change as the robot 102 executes the various turns of the route 1002. Estimator 406 may output a PDF 408 of a bias of $\omega(l)$ (i.e., a PDF representing deviation of $\omega(l)$ of route 1004 from ideal $\omega_0(l)$ of route 1014), wherein the mean of the PDF 408 of the bias may comprise a nonzero value corresponding to $\omega(l)$ being over biased or, in other instances, under biased. In some embodiments, the PDF may be generated based on measured values of $\omega(l)$ measured only during turns of the route 1004. It is appreciated that, in some instances, $\omega(l)$ may be over biased for left turns and under biased for right turns, or vice versa (e.g., due to a steering shaft encoder comprising a leftward bias). Accordingly, controller 118 may account for the over or under bias of $\omega(l)$ along the entirety of the route 1004 and manipulate route 1004 and map 1002 data to generate the map 1008 comprising adjusted route 1010, adjusted route 1010 being generated based on changes to the route data as route 1004 by accounting for biases of $\omega(l)$. That is, the over bias of $\omega(l)$ is accounted for by adjusting route 1004 to comprise smaller turns due to the determined over bias of $\omega(l)$, which causes turns of route 1004 to be measured and mapped larger or sharper than they appear to an external observer, as illustrated by adjusted route 1010 being different from route 1004. As illustrated, the map 1008 and adjusted route 1010 are substantially similar to the reference map 1012 illustrated in FIG. 10(iii). It is appreciated that, in correcting map 1002 to map 1008 based on PDFs 412 output from an estimator 406, additional navigation parameters may be determined to comprise a bias and be accounted for, such as, for example, linear velocity, acceleration, position, or localization of the robot 102.

Objects 1006 may change shape when route 1004 is corrected to route 1010. For example, sizes, shapes, and positions of objects 1006 may be based on their relative positions to the route as measured by sensor units 114 when the robot 102 is navigating the route. Using raw sensor data which generates route 1004 comprising errors with respect to ground truth route 1014, objects 1004 may be mapped based on their relative positions to route 1004 as measured by sensor units 114. By correcting route 1004 to route 1010 and maintaining the same relative positions (and accounting for any determined biases of sensor units 114 used to detect the objects 1006), the shapes and sizes of objects 1006 are also changed, as illustrated in FIG. 10(i-ii). That is, data representing the objects 1006 may not be changed, unless the sensor units 114 used to detect the objects 1006 is determined to comprise a bias, wherein changes to the shapes of objects 1006 may be based on changes to route 1004 to route 1010 by maintaining their relative positions as measured by the sensor units 114. For example, if an object 1006 is detected 6 feet to the left of a route 1004 at a distance $l_0$ along the route, the object 1006 may maintain its 6 foot position to the left of corrected route 1010 at the same distance $l_0$ along the corrected route 1010, unless the sensor units 114, which localizes the object 1006, are determined to comprise a bias using the systems and methods illustrated in FIG. 4A-C.

According to at least one non-limiting exemplary embodiment, a route may be navigated by a robot 102 by a controller 118 of the robot 102 executing a first sequence or set of actuator commands to actuator units 108. The first set of actuator commands may comprise high level commands (e.g., turn left by 10°, move straight for 3 feet, etc.), low level commands (e.g., provide 6 volts of power to wheel motors), or a combination thereof. The set of actuator commands, when executed by the controller 118, configures the actuator units 108 to move the robot 102 along the route. As illustrated in FIG. 10, the route 1004 may be determined based on a first set of actuator commands which, when executed by controller 118, configure the robot 102 to navigate the route 1004 as illustrated in FIG. 10(i). This may cause the robot 102 to navigate the route improperly by, among other things, executing turns of the route too sharply due to biases of sensor units 114. Accordingly, using the systems and methods discussed above, the controller 118 may determine one or more PDFs 412 of one or more respective navigation parameter biases to be accounted for when navigating the route. In doing so, the controller 118 may modify the first set of actuator commands to produce a second set of actuator commands, the second set of actuator commands configure the robot 102 to navigate route 1010 as illustrated in FIG. 10(ii) by accounting for biases or errors in its sensor units 114 using the systems and methods depicted above.

According to at least one non-limiting exemplary embodiment, a route closure may be required for a robot 102 to learn a route, wherein a route closure comprises the robot 102 starting and finishing a route at a same position. For example, a robot 102 may sense a marker (e.g., visual marker) at the start of a route and at the end of the route to indicate the route has been completed, wherein the route comprising a closed loop is considered as a ground truth. Controller 118 may detect that route 1004 comprises a discontinuity between its starting and ending positions on map 1002. This discontinuity may indicate to the controller 118 that adjustments to the map 1002 and route 1004 as described above are required as the route 1004 does not follow to the ground truth. Accordingly, the controller 118 may utilize estimator 406 and measurements from sensor units 114 to calculate any biases in navigation parameters and modify the route 1004 in accordance with any determined bias.

According to at least one non-limiting exemplary embodiment, a kinematic model utilized by the robot 102 to generate map 1002 may comprise an error. Drawing from the above example illustrated in FIG. 9, the parameter L may be different from a value assumed by the controller 118 when generating the map 1002. Accordingly, the controller 118, using the methods disclosed above, may estimate the true value for L (e.g., using measurements taken by sensor units 114 near turns of the route) and utilize the kinematic model and the corrected estimate of L to modify the route in accordance with the kinematic model and motor commands executed during navigation of the route.

According to at least one non-limiting exemplary embodiment, a controller 118 may never produce a map 1002; rather, the controller 118 may, after robot 102 is navigated through route 1014, aggregate all sensor unit 114 data to determine PDFs 412, as illustrated in FIG. 4C above, for one or more parameters of the robot 102 to generate a map 1008. Stated differently, production of a first map 1002 and subsequent correction of the map 1002 to produce map 1008 is not intended to be limiting, as controller 118 may instead determine values for at least one parameter of the robot 102 using at least one respective PDF 412 and, based on the values of the at least one parameter, produce a map 1008 following method 1100 illustrated next in FIG. 11.

FIG. 11 illustrates a method 1100 for a controller 118 of a robot 102 to move the robot 102 along a route, according to an exemplary embodiment. It is appreciated that any steps performed by controller 118 are effectuated by the controller 118 executing computer readable instructions from memory 120.

Block 1102 comprises the controller 118 navigating the robot 102 through a route and collecting sensor data. In some embodiments, the controller 118 may navigate the robot 102 through the route by executing a first sequence of actuator commands. In some embodiments, the controller 118 may be configured in an exploration mode causing the robot 102 to explore its environment without using predetermined motions. In some embodiments, the robot 102 may be pushed, driven, pulled, or otherwise moved through the route by an operator in a training mode. Controller 118 may collect data from any or all sensor units 114 while navigating the route and store the data in memory 120.

Block 1104 comprises the controller 118 generating at least one PDF 412 of at least one respective parameter of the robot 102 based on the sensor data acquired in block 1102. The at least one parameter of the robot 102 may include parameters of physical features of the robot 102 (e.g., wheel separation L discussed above, mass, water level in a tank 702, etc.), internal diagnostics (e.g., time delays between two sensor units 114, biases of IMUs, etc.), or movement of the robot 102 (e.g., navigation parameter values and biases). The at least one PDF 412 of the at least one respective parameter may be generated using measurements from at least two sensor units 114 as use of a single sensor units 114 to generate the PDF 412 may yield a PDF 412 susceptible to noise and/or biases of the single sensor unit 114, wherein estimator 406 may collect measurements from the at least two sensors to generate the PDF 412. That is, use of two or more sensor units 114 to generate respective PDFs 412 of respective parameters of the robot 102 may further enhance accuracy of a determined value of each of the at least one parameters of the robot 102, as illustrated below, by removing a reliance on a single sensor unit 114 to measure a value of the parameter which may be susceptible to biases and noise of the single sensor units 114.

Block 1106 comprises of the controller 118 determining a variance threshold 602 is exceeded for any one of the at least one PDF 412. A variance threshold 602 being exceeded may correspond to one or more sensor units 114 used to generate a PDF 412, which exceeds the threshold 602 comprising a large bias or noise. For example, and without limitation, if a first sensor measures a steering angle of a front wheel of a robot 102 to be 10° and a second sensor measures the steering angle to be 30°, the resulting PDF 412 of steering angle of the front wheel may comprise a large variance potentially exceeding threshold 602. Had both the first and second sensors measured steering angles substantially similar to each other (e.g., within +5° due to noise), the variance threshold 602 may not be exceeded.

Upon the controller 118 determining the variance threshold 602 is not exceeded for any of the at least one PDF 412, the controller 118 may move to block 1110.

Upon the controller 118 determining the variance threshold 602 is exceeded for any of the at least one PDF 412, the controller 118 may move to block 1108.

Block 1108 comprises of the controller 118 performing internal diagnostics to determine one or more poor sensor units 114. A poor sensor units 114 may comprise a sensor with a large bias and/or noise which may need to be recalibrated (e.g., by a human) or replaced for safe and accurate navigation of the robot 102. To determine which sensor units 114 comprises a poor sensor, the controller 118 may determine which sensor units 114 are utilized to generate the PDF 412 which exceeds the variance threshold 602. Drawing from the above example illustrated in FIG. 3, wherein ω is being measured using data from a gyroscope, a LiDAR sensor (e.g., using SLO), and a wheel encoder, if $\omega_{LiDAR}$ as measured by the LiDAR produces substantially different values for ω than the gyroscope and wheel encoders, the LiDAR may be determined to comprise the poor sensor. Similarly, if the PDF 412 of ω does not exceed variance threshold 602 when $\omega_{LiDAR}$ measurements are omitted, but the calculation of PDF 412 does exceed the variance threshold 602 when $\omega_{LiDAR}$ is accounted for, the LiDAR may be determined to comprise the poor sensor. Advantageously, due to each PDF 412 being generated using data from a specified two or more sensor units 114, the controller 118 may narrow a diagnostic search for a poor sensor which causes PDF 412 to exceed threshold 602 to only the specified two or more sensor units 114, rather than all sensor units 114, thereby enhancing speed and reliability that a poor sensor unit 114 is identified by the controller 118.

For example, a wheel encoder and a gyroscope, among other sensors, may be utilized to determine linear velocity of a robot 102. A PDF 412 of linear velocity generated based on measurements from the wheel encoder and the gyroscope may comprise a variance exceeding variance threshold 602, corresponding to measurements of linear velocity being substantially different as measured by the two sensors. The controller 118 may utilize a separate PDF 412 which does not exceed the threshold 602 but does utilize measurements from the gyroscope to indicate that the gyroscope is not the biased or noisy instrument; rather, the wheel encoder is. This determination may be further verified based on PDFs 412 generated by the wheel encoder measurements also comprising a variance exceeding the variance threshold 602. Stated differently, due to each PDF 412 being generated based on predetermined sets of equations, the predetermined sets of equations may be traced backwards to determine a poor sensor which causes a variance of a PDF 412 to exceed the variance threshold 602.

According to at least one non-limiting exemplary embodiment, a PDF 412 exceeding a variance threshold 602 may cause controller 118 to execute a predetermined sequence of computer readable instructions to perform diagnostics. The predetermined sequence of computer readable instructions may be predetermined by a manufacturer or operator of the robot 102. In some embodiments, these predetermined computer readable instructions may alert a manufacturer or operator of the robot 102 that one or more sensor units 114 require further calibration.

Controller 118 may, in some instances, return to block 1102 to navigate through the route upon diagnosing and correcting or calibrating a poor sensor unit 114 (e.g., by activating an actuator unit 108 coupled to the poor sensor unit 114) to collect sensor data of the route with the now calibrated sensor unit 114. In some instances, corrections to a poor sensor may be required to be made by a human, wherein the controller 118 may return to block 1102 at a later time upon receiving instruction from the human (e.g., via user interface units 112) to navigate the route once the poor sensor is calibrated. In some instances, the systems and methods illustrated in FIG. 4A-C may be utilized to determine a bias in the poor sensor unit 114, wherein the bias may be further utilized by the controller 118 to adjust data collected by the poor sensor unit 114 based on the bias. The adjusted data may cause the PDF 412 to no longer exceed the threshold 602, as the bias is being accounted for, wherein controller 118 may move to block 1110.

Block 1110 comprises the controller 118 determining a value for each of the at least one parameters of the robot based on the respective at least one PDFs 412 generated in block 1104. In some embodiments, the value may be a mean value of a respective PDF 412. In some embodiments, the value may be a most probable value of a respective PDF 412. The value for each respective PDF 412 may represent an estimated value of a respective parameter of the robot 102.

Block 1112 comprises the controller 118 generating a computer readable map of an environment of the robot 102 based on the at least one value of the respective at least one parameter of the robot 102. For example, the at least one value may comprise of estimated values for, without limitation, linear velocity along the route v(l), angular velocity along the route ω(l), position (x, y) of the robot 102 along the route (e.g., with respect to an origin), wheel separation L as illustrated in FIG. 9 above, and so forth. Using these estimated values of the respective parameters, the computer readable map may be generated. The computer readable map may comprise route data generated, at least in part, based on the at least one values of the respective at least one parameters of the robot 102. The computer readable map may further comprise objects localized therein. That is, controller 118 determines at least one value of at least one respective parameter of the robot 102 based on the respective at least one PDFs 412 and generates a computer readable map based on the at least one value (e.g., as illustrated in FIG. 10(ii)), wherein generation of a first map 1002 as illustrated in FIG. 10(i) is not intended to be a limiting step in the mapping process.

Block 1114 comprises the controller 118 moving the robot 102 based on the computer readable map produced in block 1112. The computer readable map comprises, at least in part, data of a route. The controller 118 may output signals to one or more actuator units 108 of the robot 102 to effectuate the movement along the route.

According to at least one non-limiting exemplary embodiment, robot 102 may not generate a map of its environment to navigate. For example, a robot 102 may be configured to follow walls or visual markers within its environment to determine its motions, rather than rely on a computer readable map. Accordingly, the value for each of the at least one parameter of the robot 102 may be utilized to determine characteristics of the robot 102 (e.g., wheel separation L, biases in sensor units 114, navigation parameter biases, etc.) such that a controller 118 of the robot 102 may plan its motion and signals to actuator units 108 accordingly. That is, method 1100 is not intended to be limiting to robots 102 capable of generating computer readable maps.

Although the present disclosure illustrates systems and methods for determining one or more probabilistic distribution of bias values of one or more corresponding navigation parameters, one skilled in the art would appreciate that the systems and methods of the present disclosure may be utilized to determine a probabilistic distribution of values for any parameter of a robot 102. By way of an illustrative example, the system illustrated in FIG. 4A may be utilized to determine a mass of a robot 102 or a mass of a feature of the robot 102 (e.g., a robotic arm or other modular attachment) based on sensor and odometry data 402, wherein each navigation parameter calculation block 404 may be utilized to calculate the mass of the robot 102 based on, for example, power consumption from one or more actuators, torque on one or more actuators or joints, and/or forces applied to regions of the robot 102 such as its wheels. Similarly, the system illustrated in FIG. 4B may be utilized to calculate a plurality of parameters of a robot 102, not limited to navigation parameters, using a substantially similar method. Advantageously, the systems and methods of the present disclosure may be utilized by one skilled in the art to determine any parameter of a robot 102 with enhanced accuracy due to the distributed system of data gathering from a plurality of sensor and odometry units. Additionally, the instructions on a non-transitory computer readable storage medium disclosed herein may be communicated to a robot 102 at a remote location (e.g., far away from the operator) to enable an operator to determine one or more distributions of values of one or more parameters of the robot 102 by having a controller 118 of the robot 102 execute the computer readable instructions. Similarly, sensor and odometry data of a robot 102 may be communicated to an external server configured to execute the computer readable instructions to calculate one or more distributions of values for one or more parameters of the robot 102.

One skilled in the art would further appreciate that sensor and odometry data may be collected from a plurality of robots 102 to be used to determine a plurality of distributions of values of parameters of the plurality robots 102. By way of an illustrative example, a manufacturer of robots 102 may utilize the systems and methods of the present disclosure to ensure the manufactured robots 102 comprise substantially similar robots 102 for quality control purposes. For example, the manufacturer may utilize the system illustrated in FIG. 4B to determine an energy consumption parameter distribution by utilizing each navigation parameter N calculator block 410 to calculate energy consumption of each robot 102 based on energy consumption from actuators, sensors, and/or any other part of the individual robots 102 as the robots 102 perform a task, wherein the system illustrated in FIG. 4B may output a plurality of energy consumption parameter distributions for each manufactured robot 102. The manufacturer may, following the aforementioned example, determine robots 102 which consume too much power based on a mean value exceeding an acceptable threshold value predetermined by the manufacturer. Additionally, the manufacturer may set a variance threshold 602 for the power consumption of the robots 102 such that robots 102 manufactured comprising a high variance of energy consumption may not meet a desired quality control threshold set by the manufacturer.

It will be recognized that, while certain aspects of the disclosure are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed embodiments or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure, and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended, as opposed to limiting. As examples of the foregoing, the term "including" should be read to mean "including, without limitation," "including, but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes, but is not limited to": the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein, "defined" or "determined" may include "predefined" or "predetermined" and/or otherwise determined values, conditions, thresholds, measurements, and the like.

What is claimed is:

1. A non-transitory computer readable storage medium comprising a plurality of computer readable instructions stored thereon that, when executed by a processor, configure the processor to:
    navigate a robot through a route and collect data from sensor units coupled to the robot;
    generate at least one probability distribution function (PDF) of at least one respective parameter of the robot based on the data from the sensor units, the at least one respective parameter comprising a measurement of a physical feature, motion, or internal characteristic of the robot;
    determine at least one value for the respective at least one parameter based on the respective at least one PDF; and
    move the robot with electro-mechanical components along the route based on the at least one value of each of the respective at least one parameter.

2. The non-transitory computer readable storage medium of claim 1, wherein,
    each PDF of the at least one PDF is generated using measurements from two or more sensor units.

3. The non-transitory computer readable storage medium of claim 1, wherein,
    the at least one PDF comprises, at least in part, a PDF of a navigation parameter of the robot.

4. The non-transitory computer readable storage medium of claim 1, further comprising computer readable instructions to configure the processor to:
    generate a computer readable map based on the at least one value for the respective at least one parameter, the computer readable map comprising localized objects and the route.

5. The non-transitory computer readable storage medium of claim 1, further comprising computer readable instructions to configure the processor to:
    determine if one or more sensors and odometry units of the robot require calibration from a human based on a variance of the PDF of the respective parameter meeting or exceeding a prescribed variance threshold.

6. The non-transitory computer readable storage medium of claim 1, further comprising computer readable instructions to configure the processor to:
    determine a measurement bias of a gyroscope by measuring a second value from gyroscope at designated locations along the route where the robot is idle upon a flat surface, the second value being equal to the measurement bias.

7. A non-transitory computer readable storage medium comprising a plurality of computer readable instructions stored thereon that, when executed by a processor, configure the processor to:
    navigate a robot along a route and collect data from sensors coupled to the robot;
    generate a probability distribution function (PDF) of at least one parameter of the robot based on the data from sensors, the at least one parameter describing a physical feature, movement, or internal characteristic of the robot;
    determine at least one value for the respective at least one parameter based on the respective at least one PDF;
    produce a map of an environment of the robot based on the at least one value, the map comprising the route and objects localized therein; and
    move the robot with electro-mechanical components along the route utilizing the map.

8. The non-transitory computer readable storage medium of claim 7, wherein, the at least one PDF is calculated using, at least in part, a kinematic model of the robot.

9. The non-transitory computer readable storage medium of claim 7, further comprising computer readable instructions to configure the processor to:
    utilize the at least one value and a predetermined kinematic model of the robot to determine a second value of a second parameter of the robot, the second value of the second parameter being utilized to determine actuator commands to configure motions of the robot in accordance with the kinematic model and the route.

10. The non-transitory computer readable storage medium of claim 7, wherein,
    the at least one PDF comprises, at least in part, a PDF for a distribution of gyroscope biases, the gyroscope biases being measured at points along the route when the robot is idle upon a flat surface.

11. The non-transitory computer readable storage medium of claim 7, wherein, the at least one PDF comprises, at least in part, a PDF for biases of one or more navigation parameters of the robot.

12. The non-transitory computer readable storage medium of claim 7, wherein,
    the at least one PDF comprises, at least in part, PDF for a distribution of time delays between measurements received by the processor from a first sensor unit and a second sensor unit;
    the respective value determined based on the PDF represents a most probable or average value of the time delay; and
    the map is produced based on measurements from the first and second sensor units by accounting for the value of the time delay between measurements from the respective first and second sensors.

13. A method for determining a parameter of a robot, comprising:
    navigating the robot along a route while collecting data from sensors coupled to the robot;
    calculating at least two values of the parameter based on measurements from at least two respective sensor units, the at least two values being calculated based on a predetermined equation or model;
    collecting measurements of the at least two values as or after the robot navigates the route to generate a probability density function (PDF) of the parameter;
    estimating a first value of the parameter based on the PDF; and
    moving the robot with electro-mechanical components along the route based on the first value.

14. The method of claim 13, wherein,
    the estimated first value comprises a deviation from an ideal value of the parameter, the ideal value is a value of navigation parameter specified by a predetermined calibration default.

15. The method of claim 13, further comprising:
    producing a computer readable map based on, at least in part, the first value, the computer readable map comprising the route and localized objects.

16. The method of claim 13, wherein, the at least two values comprise a first value and a second value, the first value being calculated using standalone laser odometry and the second value comprising gyroscope measurements; and the estimated first value comprises a time delay between measurements between the standalone laser odometry and gyroscope which indicate the robot is turning during portions of the route.

17. The method of claim 16, further comprising:

measuring biases of the gyroscope at locations where the robot is idle upon a flat surface; and accounting for the measured biases of the gyroscope during estimation of the first value of the time delay.

18. The method of claim 13, wherein, the first value comprises a measure of wheel separation of the robot determined, in part, using a kinematic model of the robot.

* * * * *

UNITED STATES PATENT AND TRADEMARK OFFICE
CERTIFICATE OF CORRECTION

PATENT NO. : 11,454,983 B2
APPLICATION NO. : 17/176501
DATED : September 27, 2022
INVENTOR(S) : Oleg Sinyavskiy and Girish Bathala It is certified that error appears in the above-identified patent and that said Letters Patent is hereby corrected as shown below:

In the Claims

1. In Column 45, Lines 20-21, change "determine at least one value for the respective at least one parameter based on the respective at least one PDF" to --determine at least one value for the at least one respective parameter based on the at least one PDF--.
2. In Column 45, Lines 22-24, change "move the robot with electro-mechanical components along the route based on the at least one value of each of the respective at least one parameter" to --move the robot with electro-mechanical components along the route based on the at least one value of each of the at least one respective parameter--.
3. In Column 45, Lines 27-28, change "each PDF of the at least one PDF is generated using measurements from two or more sensor units" to --the at least one PDF is generated using measurements from two or more sensor units--.
4. In Column 45, Lines 36-39, change "generate a computer readable map based on the at least one value for the respective at least one parameter, the computer readable map comprising localized objects and the route" to --generate a computer readable map based on the at least one value for the at least one respective parameter, the computer readable map comprising localized objects and the route--.
5. In Column 45, Lines 43-46, change "determine if one or more sensors and odometry units of the robot require calibration from a human based on a variance of the PDF of the respective parameter meeting or exceeding a prescribed variance threshold" to --determine if one or more sensors and odometry units of the robot require calibration from a human based on a variance of the PDF of the at least one respective parameter meeting or exceeding a prescribed variance threshold--.
6. In Column 45, Lines 66-67, change "determine at least one value for the respective at least one parameter based on the respective at least one PDF" to --determine at least one value for the at least one respective parameter based on the PDF--.
7. In Column 46, Lines 7-8, change "wherein, the at least one PDF is calculated using, at least in part, a kinematic model of the robot" to --wherein, the PDF is calculated using, at least in part, a kinematic model of the robot--.
8. In Column 46, Lines 14-17, change "the second value of the second parameter being utilized to determine actuator commands to configure motions of the robot in accordance with the kinematic Signed and Sealed this
Fourth Day of March, 2025

Coke Morgan Stewart
*Acting Director of the United States Patent and Trademark Office*

CERTIFICATE OF CORRECTION (continued)
U.S. Pat. No. 11,454,983 B2 model and the route" to --the second value of the second parameter being utilized to determine actuator commands to configure motions of the robot in accordance with the predetermined kinematic model and the route--.

9. In Column 46, Line 21, change "the at least one PDF comprises" to --the PDF comprises--.

10. In Column 46, Lines 26-28, change "wherein, the at least one PDF comprises, at least in part, a PDF for biases of one or more navigation parameters of the robot" to --wherein, the PDF comprises, at least in part, a PDF for biases of one or more navigation parameters of the robot--.

11. In Column 46, Line 32, change "the at least one PDF comprises" to --the PDF comprises--.

12. In Column 46, Line 36-37, change "the respective value determined based on the PDF represents a most probable or average value of the time delay" to --the at least one value determined based on the PDF represents a most probable or average value of the time delays--.

13. In Column 46, Lines 39-42, change "the map is produced based on measurements from the first and second sensor units by accounting for the value of the time delays between measurements from the respective first and second sensors" to --the map is produced based on measurements from the first and second sensor units by accounting for the most probable or average value of the time delays between measurements from the first and second sensor units--.

14. In Column 46, Lines 60-61, change "the estimated first value comprises a deviation from an ideal value of the parameter" to --the estimating of the first value comprises a deviation from an ideal value of the parameter--.

15. In Column 47, Lines 6-9, change "the estimated first value comprises a time delay between measurements between the standalone laser odometry and gyroscope which indicate the robot is turning during portions of the route" to --the estimating of the first value comprises a time delay between measurements between the standalone laser odometry and gyroscope which indicate the robot is turning during portions of the route--.

16. In Column 47, Lines 13-14, change "accounting for the measured biases of the gyroscope during estimation of the first value of the time delay" to --accounting for the measuring of biases of the gyroscope during estimation of the first value of the time delay--.